United States Patent
Zhu et al.

(10) Patent No.: US 7,327,420 B2
(45) Date of Patent: Feb. 5, 2008

(54) REFLECTIVE LIQUID CRYSTAL PROJECTION DISPLAYS WITH LOW VOLTAGE AND HIGH CONTRAST USING IMPROVED BISECTOR EFFECT

(75) Inventors: Xinyu Zhu, Orlando, FL (US); Shin-Tson Wu, Oviedo, FL (US)

(73) Assignees: Research Foundation of the University of Central Florida, Incorporated, Orlando, FL (US); Toppoly Optoelectronics Corp. (TW)

( * ) Notice: Subject to any disclaimer, the term of this patent is extended or adjusted under 35 U.S.C. 154(b) by 188 days.

(21) Appl. No.: 10/987,805

(22) Filed: Nov. 12, 2004

(65) Prior Publication Data
US 2006/0103791 A1 May 18, 2006

(51) Int. Cl.
*G02F 1/1335* (2006.01)

(52) U.S. Cl. .......................... 349/113; 349/96
(58) Field of Classification Search ............... 349/113, 349/123, 96, 114, 128, 179, 117
See application file for complete search history.

(56) References Cited

U.S. PATENT DOCUMENTS

| | | | | |
|---|---|---|---|---|
| 4,378,955 A | * | 4/1983 | Bleha et al. | 349/5 |
| 5,490,003 A | | 2/1996 | Van Sprang | 359/63 |
| 5,936,697 A | | 8/1999 | Yang | 349/180 |
| 6,466,284 B1 | * | 10/2002 | Yeung | 349/76 |
| 6,480,251 B1 | * | 11/2002 | Yamaguchi et al. | 349/119 |

* cited by examiner

*Primary Examiner*—Thoi V. Duong
(74) *Attorney, Agent, or Firm*—Brian S. Steinberger; Phyllis K. Wood; Law Offices of Brian S. Steinberger, P.A.

(57) ABSTRACT

Methods, systems, devices and apparatus of using a reflective liquid crystal device for projection display operating at a reduced driving voltage and having an increased contrast ratio are disclosed. The reflective liquid crystal device comprises a first substrate, a second substrate with reflector means, and a twisted nematic liquid crystal layer between the first substrate and the second substrate. A polarizing beam splitter is placed outside of the reflective liquid crystal device and adjacent to the first substrate. By setting the entrance polarization direction of the polarizing beam splitter along the azimuthal angle of the linearly polarized eigenmode of the reflective liquid crystal device at the designed driving voltage, a perfect dark state is obtained, which leads to a high contrast ratio at the designed low driving voltage.

2 Claims, 31 Drawing Sheets

REFLECTIVE LIQUID CRYSTAL PROJECTION DISPLAYS WITH LOW VOLTAGE AND HIGH CONTRAST USING IMPROVED BISECTOR EFFECT

This invention relates to reflective liquid crystal valve for projection display, and in particular to methods, systems, devices and apparatus for using a novel polarization angle for reducing the driving voltage, enhancing the contrast ratio, and reducing the color dispersion.

BACKGROUND AND PRIOR ART

The reflective liquid crystal display (LCD) 100 for projection application as depicted in FIG. 1 has been used for front projectors and rear projection TVs. The whole system includes a polarizing beam splitter (PBS) 110 and a reflective liquid crystal (LC) panel 120. Several LC modes have been used, such as (1) vertical alignment (VA) mode disclosed in M. F. Schiekel and K. Fahrenschon, "Deformation of Nematic Liquid Crystals with Vertical Orientation in Electrical Fields", *Appl. Phys. Lett.*, Vol. 19, p. 391, (1971), (2) 45° hybrid field effect (HFE) mode discussed in J. Grinberg, et al, "A New Real-Time Noncoherent to Coherent Image Converter: the Hybrid Field Effect Liquid Crystal Light Valve", *Opt. Eng.*, Vol. 14, p. 217, (1975), (3) 63.6° twisted nematic-electronically controlled birefringence (TN-ECB) mode disclosed in T. Sonehara, *"Photo-Addressed Liquid Crystal SLM with Twisted Nematic ECB (TN-ECB) Mode"*, *Jpn. J. Appl. Phys.*, Vol. 29, L1231, (1990), and (4) mixed twisted-nematic (MTN) mode disclosed in S. T. Wu and C. S. Wu, "Mixed-Mode Twisted Nematic Liquid Crystal Cells for Reflective Displays", *Appl. Phys. Lett.*, Vol. 68, p. 1455, (1996).

In a high resolution projection display, the pixel size is comparable to the cell gap. The fringing field between adjacent pixels could reorient the LC directors and then degrade the image contrast ratio and reduce display brightness. See, for example, K.-H. Fan Chiang, S. T. Wu and S. H. Chen, "Fringing Field Effect of the Liquid-Crystal-on-Silicon Devices", *Jpn. J. Appl. Phys.* Vol. 41, p. 4577, (2002). Therefore, to decrease the fringing field effect, low driving voltage is preferred for achieving high resolution, high contrast ratio and high brightness projection display. Although the MTN mode can reach a relatively low voltage compare to other modes, its fringing field is still prominent.

In order to get a low driving voltage, U.S. Pat. No. 5,490,003 issued to Van Sprang on Feb. 6, 1996 reveals a reflective LCD using positive dielectric anisotropic LC material with the entrance polarization direction set at the bisector of twist angle, and U.S. Pat. No. 5,936,697 issued to Yang on Aug. 10, 1999 proposed the self-compensated TN concept using negative dielectric anisotropic LC materials. Both patents set the entrance polarization direction at the bisector of twist angle in order to achieve a self-compensation effect. In addition, the self-compensated TN mode and bisector effect in transmissive and reflective TN cell were published in K. H. Yang, "A Self-Compensated Twisted-Nematic Liquid Crystal Mode for Reflective Light Valves", *Euro display '96*, p. 449 (1996) and S. T. Wu and C. S. Wu, "Bisector Effect on the Twisted-Nematic Cells", *Jpn. J. Appl. Phys.*, Vol. 37, L1497, (1998), respectively. These two publications refer to the bisector effect of a TN cell.

The present invention advances the art by providing a method and a device that positions the entrance polarization direction of PBS to form an angle β with respect to the rubbing direction of the top substrate, where β angle deviates from the bisector of twist angle which is used in the prior art. Using the entrance polarization angle of PBS determined by the present invention, the contrast ratio increases dramatically and the driving voltage decreases significantly. Decreasing the driving voltage also minimizes the fringing field effect of the reflective liquid crystal cell. By taking the boundary layer residual phase retardation into consideration, the optimal entrance polarization angle is determined to be approximately 1-3° higher than the prior art bisector effect to achieve an approximately perfect dark state at the decreased driving voltage.

SUMMARY OF THE INVENTION

A primary objective of this invention is to provide methods, systems, devices and apparatus for projection display by using a new reflective liquid crystal valve configuration with lower driving voltage to reduce the fringing field effect and improve resolution.

A secondary objective of this invention is to provide methods, systems, devices and apparatus for projection display by using a new reflective liquid crystal valve configuration with higher contrast ratio to obtain high quality large screen projection displays, such as home theater, conference projector etc.

A third objective of this invention is to provide methods, systems, devices and apparatus for projection display by using a new reflective liquid crystal valve configuration with lower color dispersion.

A preferred embodiment of a reflective liquid crystal projection display device can include a first substrate with a first alignment film and a first alignment direction, a second substrate with a second alignment film and a second alignment direction, a liquid crystal layer with positive dielectric constant sandwiched between the first substrate and the second substrate, and a polarizing means and an analyzing means placed outside of the first substrate which is opposite to the liquid crystal layer, wherein the first substrate further is transparent, wherein the second substrate further comprises a reflector means on an inner side which is adjacent to the liquid crystal layer, wherein the liquid crystal layer forms a twist angle φ between the second alignment direction on the second substrate and the first alignment direction on the first substrate, wherein the polarizing means has a first linear polarization direction while the analyzing means has a second linear polarization direction, and the first linear polarization direction of the polarizing means is approximately perpendicular to the second linear polarization direction of the analyzing means, and wherein the first linear polarization direction of the polarizing means deviates from the bisector direction of the twist angle of the liquid crystal layer.

The liquid crystal layer can form a left-handed twist structure with a twist angle φ in the range of approximately 40° to approximately 80°.

The liquid crystal layer can have a phase retardation value dΔn/λ in the range of approximately 0.4 to approximately 0.8, where d is the thickness of the liquid crystal layer; Δn is the birefringence of liquid crystal materials and λ is the wavelength of incident light.

The polarization direction of the polarizing means can form an angle β with the first alignment direction on the first substrate, wherein the angle β lies in the range of approximately φ/2 to approximately φ/2+15°.

The polarization direction of the polarizing means can form an angle β with the first alignment direction on the first substrate, wherein the angle β lies in the range of approximately φ/2±90° to approximately φ/2+15°±90°.

The liquid crystal layer can form a right-handed twist structure with a twist angle φ in the range of approximately −80° to approximately −40°.

The liquid crystal layer can have a phase retardation value dΔn/λ in the range of approximately 0.4 to approximately 0.8, where d is the thickness of the liquid crystal layer; Δn is the birefringence of liquid crystal materials and λ is the wavelength of incident light.

The polarization direction of the polarizing means can form an angle β with the first alignment direction on the first substrate, wherein the angle β lies in the range of approximately φ/2−15° to approximately φ/2.

The polarization direction of the polarizing means can form an angle β with the first alignment direction on the first substrate, wherein the angle β lies in the range of approximately φ/2−15°±90° to approximately φ/2±90°.

A preferred method of making a reflective liquid crystal projection display device with high contrast ratio and low driving voltage, can include the steps of providing a reflective liquid crystal device including a first substrate, a second substrate with reflector means, and a twisted nematic liquid crystal layer between the first substrate and the second substrate, providing a polarizing beam splitter outside of the reflective liquid crystal device and adjacent to the first substrate, and positioning the entrance polarization direction of the polarizing beam splitter to deviate from the bisector direction of the twist angle of the twisted nematic liquid crystal layer.

The method can further include the steps of determining the azimuthal angle of the linearly polarized eigenmode of the reflective liquid crystal device at the designed driving voltage and setting the entrance polarization direction of the polarizing beam splitter along the azimuthal angle of the linearly polarized eigenmode of the reflective liquid crystal device at the designed driving voltage.

Further objects and advantages of this invention will be apparent from the following preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
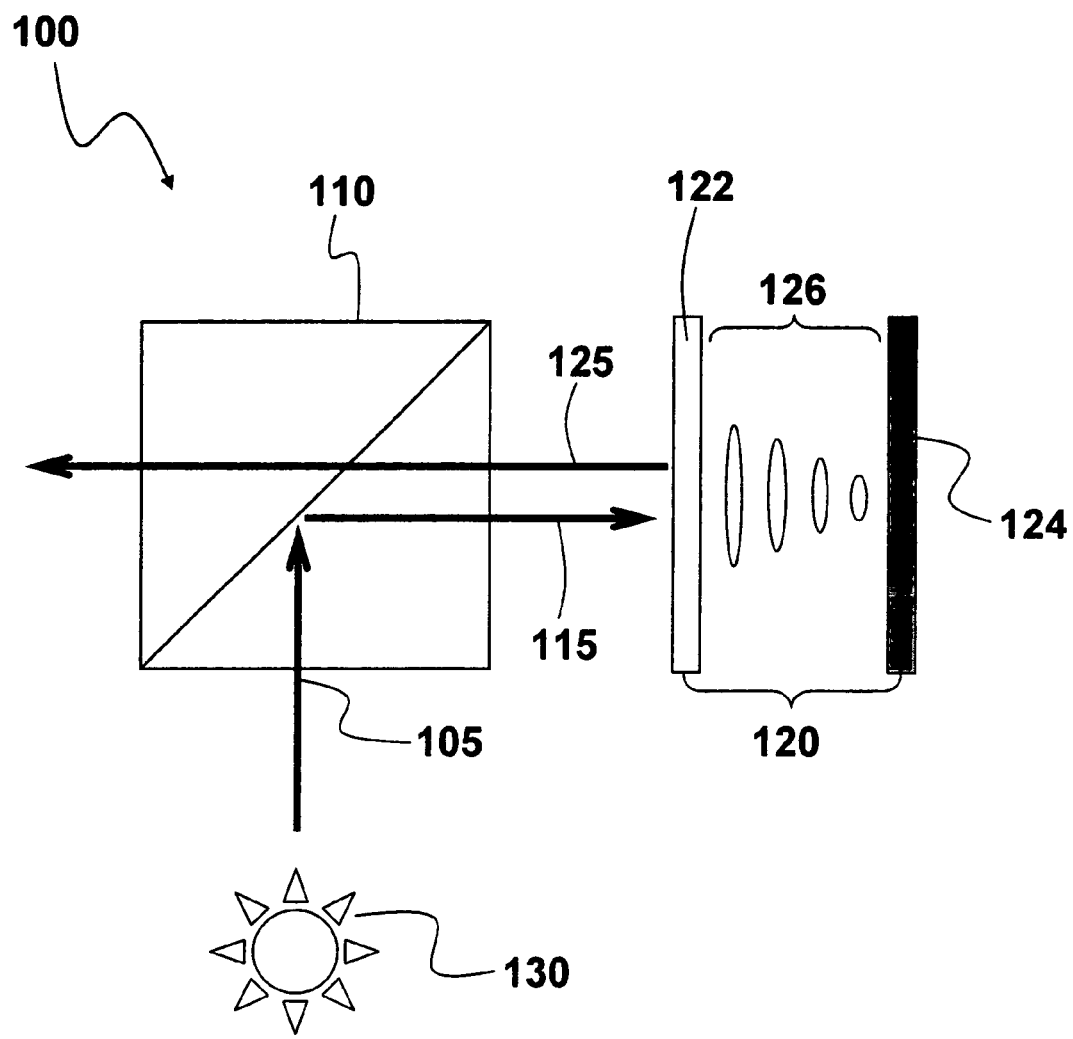
FIG. 1 is a schematic diagram of the reflective liquid crystal valve for projection display.

A conventional projection display system 100 includes a polarizing beam splitter (PBS) 110, a reflective liquid crystal cell 120 and a light source 130, as shown in FIG. 1. The reflective liquid crystal cell 120 includes a first transparent substrate 122 with a first alignment film, a second substrate 124 with a second alignment film and a liquid crystal layer 126 with a positive dielectric constant between the first substrate 122 and the second substrate 124. The second substrate 124 includes a reflector on the inner surface, adjacent to the liquid crystal layer. The PBS 110 has a crossed polarizer and analyzer configuration, which means the polarization direction of the polarizing means is substantially perpendicular to the polarizing direction of the analyzing means. Therefore, if the entrance polarization direction of the polarizing means makes an angle β with the alignment direction of the liquid crystal layer on the first substrate 122, then the analyzing means makes β±approximately 90° with the alignment direction of the liquid crystal layer on the first substrate 122.

Referring back to FIG. 1, the unpolarized light 105 from light source 130 becomes linearly polarized light 115 after passing through the polarizing means of the PBS 110, and impinges onto the reflective TN-LC cell 120. When returning from the reflective TN-LC cell 120, the reflected light 125 encounters the analyzing means of the PBS 110. The polarization state of the reflected light 125 determines the output reflectance. In order to get a high contrast ratio, which is important for large screen projection display with high quality, such as home theater, conference projector etc, a substantially perfect dark state is preferable. To achieve a substantially perfect dark state, the incident linearly polarized light 115 should be unchanged after a round trip in the reflective TN-LC cell 120, so that the identical reflected linearly polarized light 125 is blocked by the analyzing means of the PBS 110, and as a result, a very good dark state is obtained. In the preferred embodiment, the linear polarized light 115 is an eigenmode of the reflective TN-LC cell in order to achieve the high contrast ratio.

Two different models, uniform-twist model and two-layer model, are described here before describing the eigenmodes in a reflective TN-LC cell. In a reflective TN-LC cell with positive dielectric anisotropic liquid crystals, the pretilt angle at the substrates boundary is small, approximately 1-5°. The liquid crystal molecules undergo a uniform twist throughout the cell when the applied voltage is below a threshold. When the applied voltage is approximately 2 times higher than the threshold voltage, the liquid crystal molecules in the middle of the liquid crystal layer are aligned approximately parallel to the electric field. However, the boundary layers near the top and bottom substrate interfaces are hardly disturbed because of strong surface anchoring. Therefore, the TN-LC cell is described by a uniform-twist model when the applied voltage is below a threshold and by a two-layer model when the applied voltage is approximately 2 times higher than the threshold voltage.

In the uniform-twist model, there are two eigenmodes for the reflective TN-LC cell and both eigenmodes are linearly polarized and orthogonal to each other. The azimuthal angles of these two linear polarization states are determined by θ angle in the following equation 1.

$$\tan\theta = -\frac{\cos X \pm \sqrt{1 - \left(\frac{\Gamma}{2}\frac{\sin X}{X}\right)^2}}{\phi\frac{\sin X}{X}}. \quad (1)$$

Where, $\Gamma=2\pi d\Delta n/\lambda$ is the phase of the uniformly twisted TN-LC cell and $X=\sqrt{\phi^2+(\Gamma/2)^2}$ is a parameter related to both twist angle and phase of twisted TN-LC cell. Wherein, d is cell gap, Δn is the birefringence of LC material, λ is the wavelength of incident light and φ is the twist angle.

Figure 2:
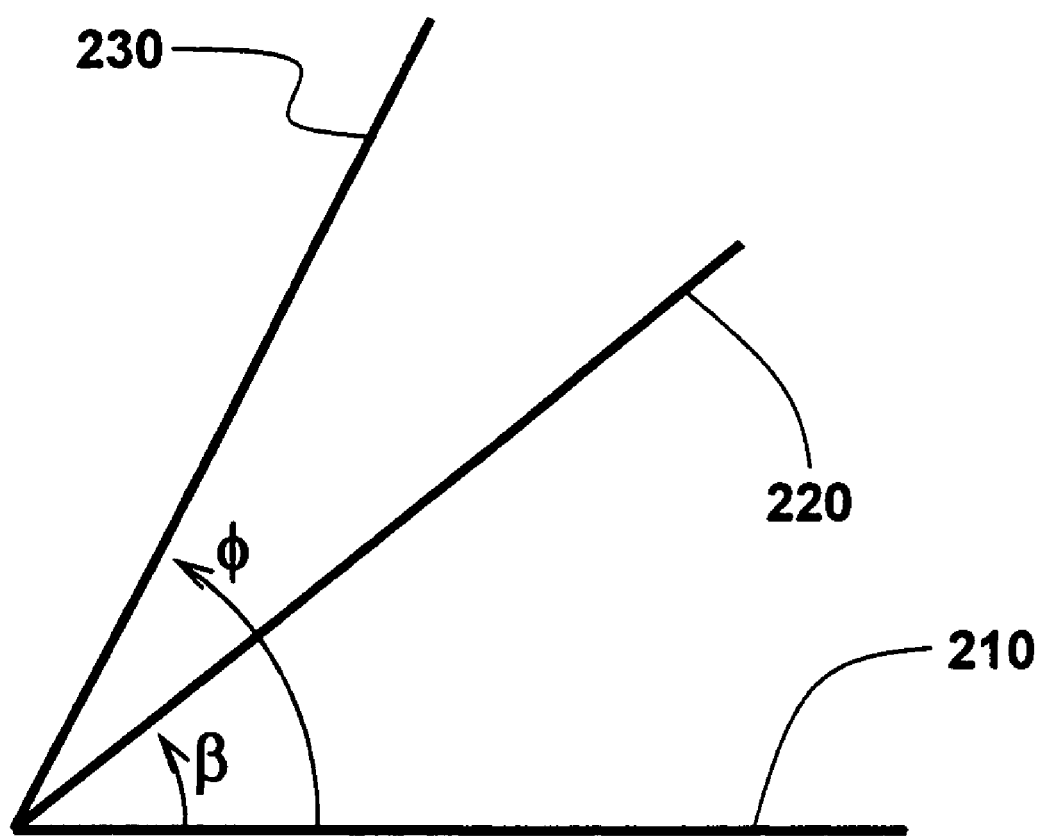
FIG. 2 illustrates the coordinates of the display system of FIG. 1.

FIG. 2 illustrates the coordinates of the system of FIG. 1. The entrance polarization direction 220 of the PBS 110 makes an angle β with respect to the liquid crystal alignment direction 210 on the top substrate 122. The twist angle of the TN-LC layer 126 is φ, which is determined by the angle between the liquid crystal alignment direction 210 on the top substrate 122 and the liquid crystal alignment direction 230 on the bottom substrate 124. The twist angle φ is defined to be positive in the counterclockwise direction based on the liquid crystal alignment direction 210 on the top substrate 122. Therefore, the left-handedness twist angle is positive and the right-handedness twist angle is negative. In a preferred embodiment of the present invention, the liquid crystal layer has a twist angle within a range of approximately approximately 40°<φ<approximately 80° for a left-handed twist liquid crystal layer and approximately −80°<φ<approximately −40° for a right-handed twist liquid crystal layer.

In the two-layer model, each boundary layer can be approximately treated as a non-twisted uniaxial layer with residual phase $\psi=2\pi\alpha/\lambda$, here α is the retardation of each boundary layer. When applied voltage increases, the retardation α decreases. Similarly, there exists two eigenmodes for the reflective TN-LC cell using the above mentioned two-layer model. Both eigenmodes are linear polarizations and are orthogonal with each other. The azimuthal angle of the two eigenmodes is given by the θ angle in the following equation 2.

$$\tan\theta = -\frac{\cos\psi\cos\phi \pm \sqrt{\cos^2\phi\cos^2\psi + \sin^2\phi}}{\sin\phi} \quad (2)$$

When the applied voltage is within an intermediate voltage range, the case is much more complicated and no approximation is made. Since the reflective TN-LC cell is described by a uniform-twist model when the applied voltage is below a threshold and by a two-layer model when the applied voltage is approximately two times the threshold voltage, the azimuthal angles of the eigenmodes should be located between the obtained results of uniform-twist model and two-layer model when an intermediate voltage is applied.

Figure 3A:
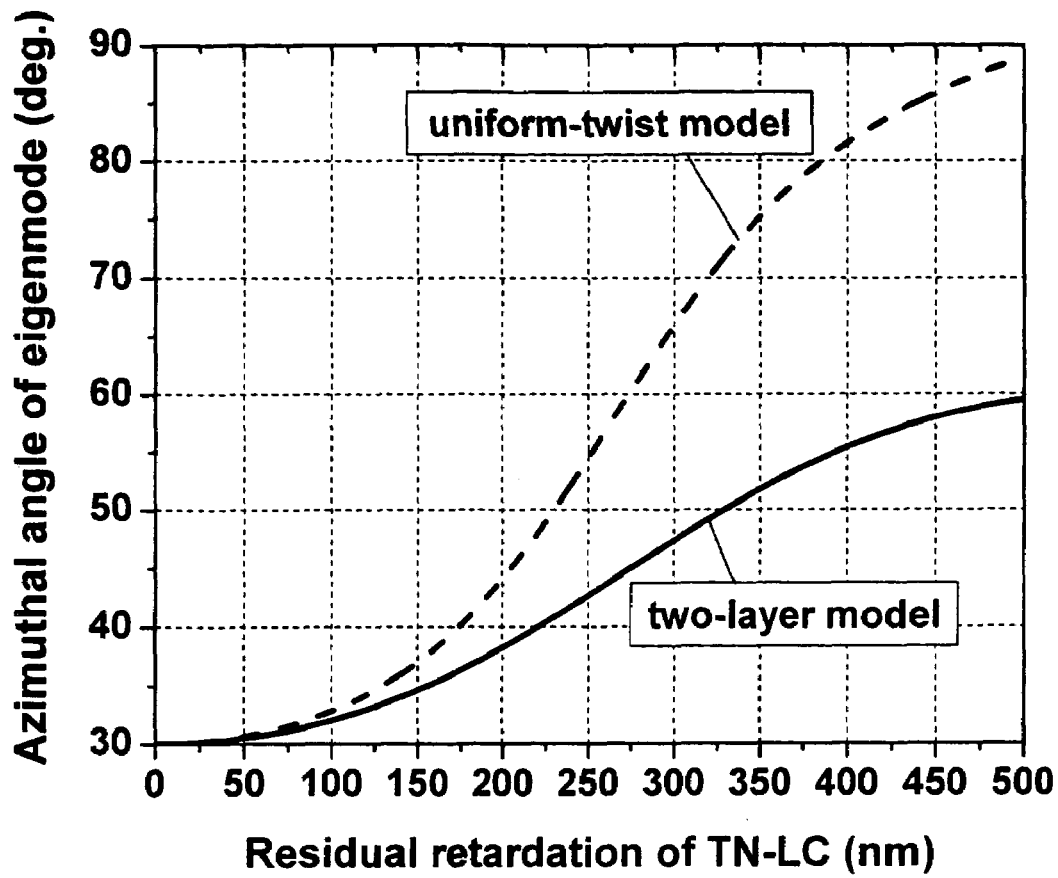
FIGS. 3A and 3B illustrate the relationship between the azimuthal angles of the eigenmodes and the residual phase retardation in the case of left-handedness 60° reflective twisted nematic TN-LC cell for eigenmode 1 and eigenmode 2, respectively.
Figure 3B:
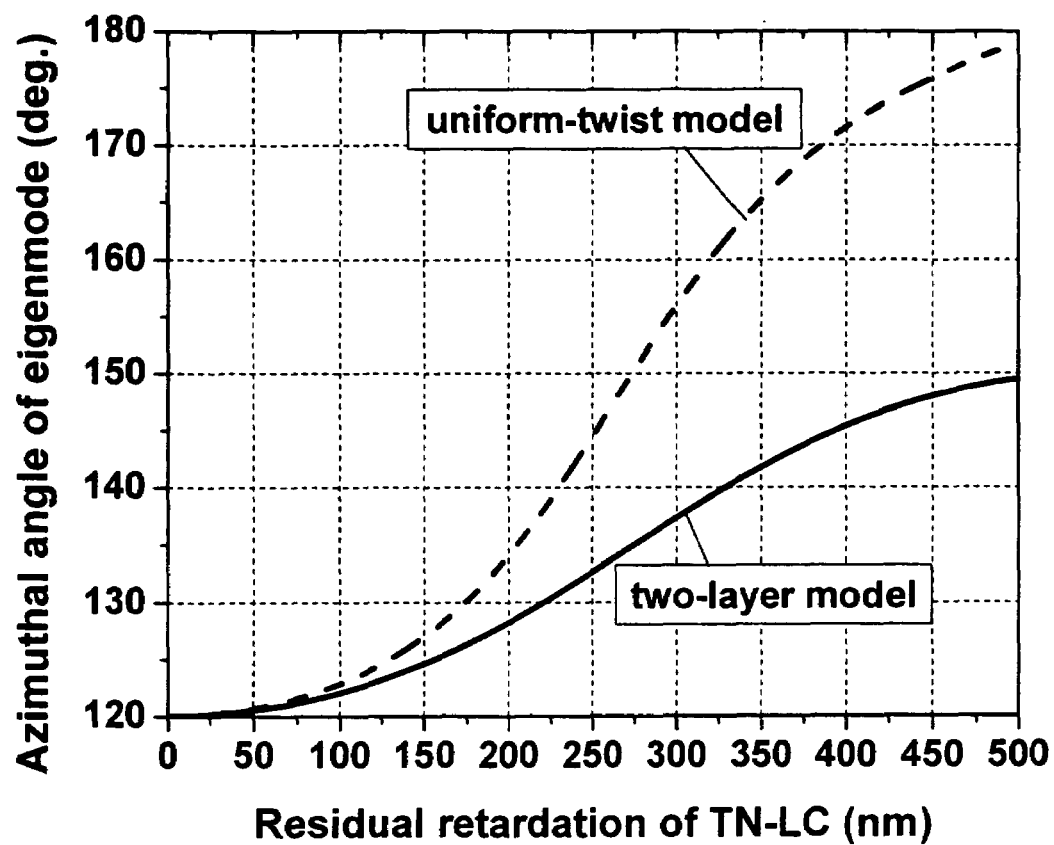

FIGS. 3A and 3B illustrate the relationship between the azimuthal angles of the eigenmodes and the residual phase retardation in the case of left-handedness approximately 60° reflective twisted nematic TN-LC cell using both uniform-twist model and two-layer model for eigenmode 1 and eigenmode 2, respectively. FIG. 4 illustrates a magnified region of the graphs of FIGS. 3A and 3B, wherein the residual phase retardation in the magnified region is between 0-100 nanometers.

According to the graph, when the residual retardation decreases, the azimuthal angles of eigenmodes gradually reach the bisector (φ/2) of twist angle or perpendicular to the bisector (φ/2±90°), which is the approach used in the prior arts. The prior art placed the entrance polarization direction of PBS at the bisector or perpendicular to the bisector. However, even when the applied voltage reaches triple of threshold voltage, the residual retardation is still much larger than 0 and as a result, the azimuthal angle of the eigenmodes are not exactly parallel to the bisector or perpendicular to the bisector.

Figure 4A:
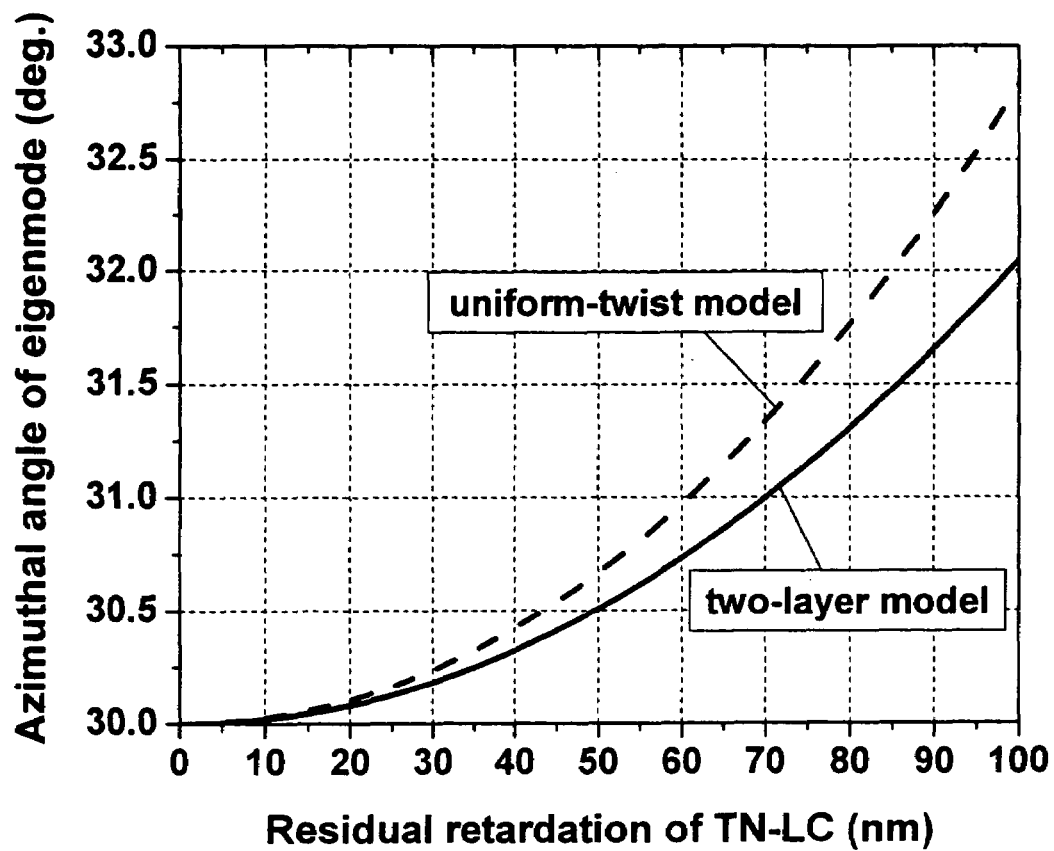
FIGS. 4A and 4B illustrate the relationship between the azimuthal angles of the eigenmodes and the residual phase retardation in the case of left-handedness 60° reflective TN-LC cell in a magnified region for eigenmode 1 and eigenmode 2, respectively.
Figure 4B:
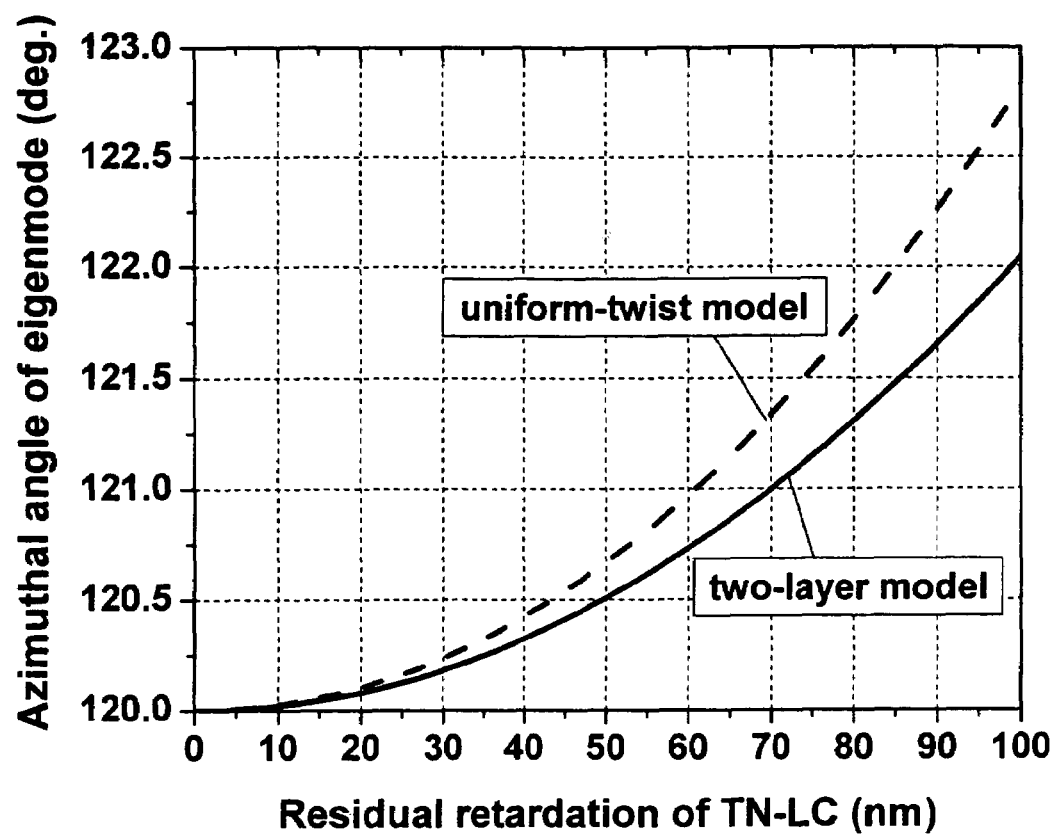
Figure 5:
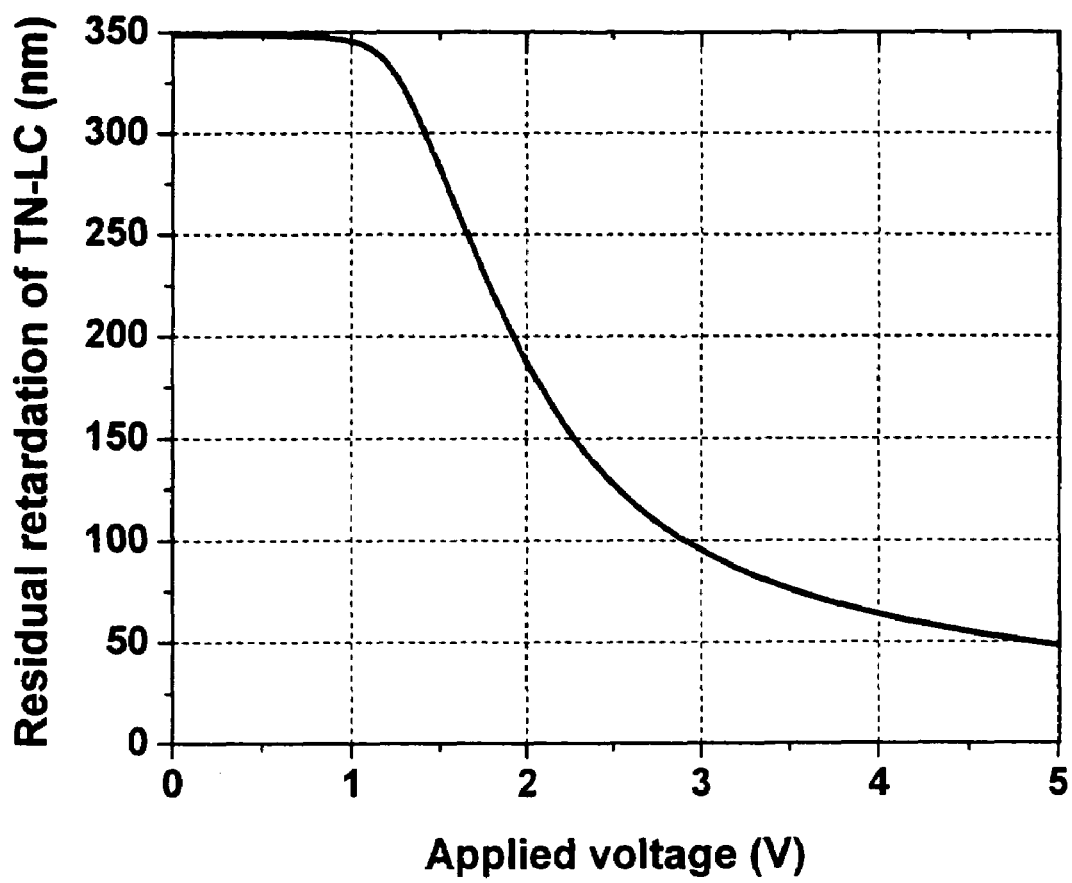
FIG. 5 shows the dependence of residual retardation on applied voltage for a 60° TN cell with dΔn=350 nm.

For example, FIG. 5 illustrates the residual retardation of a 60° TN cell with dΔn=approximately 350 nm at different applied voltage. Using the parameters listed in Table 1, even when the applied voltage is approximately 5 $V_{rms}$, the residual retardation is approximately 50 nm. With this amount of residual retardation, the azimuthal angle of eigenmode is about 0.5° larger than the bisector, as shown in FIGS. 4A and 4B.

TABLE 1

| Parameters | Value |
| --- | --- |
| $n_e$ | 1.65 |
| $n_o$ | 1.55 |
| $\epsilon_p$ | 12.0 |
| $\epsilon_v$ | 4.0 |
| $K_{11}$ | $11.5 \times 10^{-12}$ N |
| $K_{22}$ | $6.5 \times 10^{-12}$ N |
| $K_{33}$ | $16.0 \times 10^{-12}$ N |
| Pretilt angle | 3° |

In projection display, it is highly desirable to decrease the driving voltage in order to minimize the fringing field effect. Since the azimuthal angles of the eigenmodes deviate from the direction of bisector (or the direction perpendicular to bisector), the entrance polarization direction of the PBS 110 should be oriented parallel or perpendicular to the azimuthal angle of the eigenmode of the reflective TN-LC cell at the desired driving voltage. By taking the boundary residual retardation into consideration, the optimal polarization angle is determined to be approximately within a range of approximately 1° to approximately 3° higher than the bisector angle used in the prior art.

For example, referring to FIG. 5 it is seen that the residual retardation of the reflective TN-LC cell is approximately 75 nanometers when a driving voltage of approximately 3.5 $V_{rms}$ is applied. Referring to FIGS. 4A and 4B, the corresponding azimuthal angle of eigenmodes at a residual retardation of approximately 75 nanometers is approximately 1.5° larger than the azimuthal angle at the bisector. Therefore, the optimal entrance polarizer angle β between the crossed polarizer and the reflective TN-LC cell's front LC director is β=φ/2+1.5° or β=±π/2+φ/2+1.5° to achieve an approximately perfect dark state at an intermediate driving voltage of approximately 3.5 $V_{rms}$.

If the applied voltage is further increased, the residual phase gradually decreases and the corresponding azimuthal angle of eigenmodes changes accordingly. As a result, the reflectance increases slowly when the applied voltage exceeds approximately 3.5 $V_{rms}$. In a preferred embodiment of the present invention, the liquid crystal layer has a phase retardation within a range of approximately 0.4<dΔ/λ<approximately 0.8.

Referring back to FIG. 2, for a left-handed TN-LC cell with twist angle φ to achieve a high contrast ratio and low operating voltage, the entrance polarization direction 220 of PBS 110 should be set at a polarizer angle β which satisfies φ/2<β<(φ/2+15°) or (φ/2±90°)<β<(φ/2+15°±90°). On the other hand, if the reflective TN-LC is right-handed with twist angle φ (here φ is a negative value), then entrance polarization direction 220 of PBS 110 is set to form a polarizer angle β which satisfies approximately (φ/2−15°)<β<φ/2 or approximately (φ/2−15°±90°)<β<(φ/2±90°). As previously discussed, the angles are based on the liquid crystal alignment direction 210 on the top substrate 122, as shown in FIG. 2, and the counterclockwise angles are positive while clockwise angles are negative.

Figure 6A:
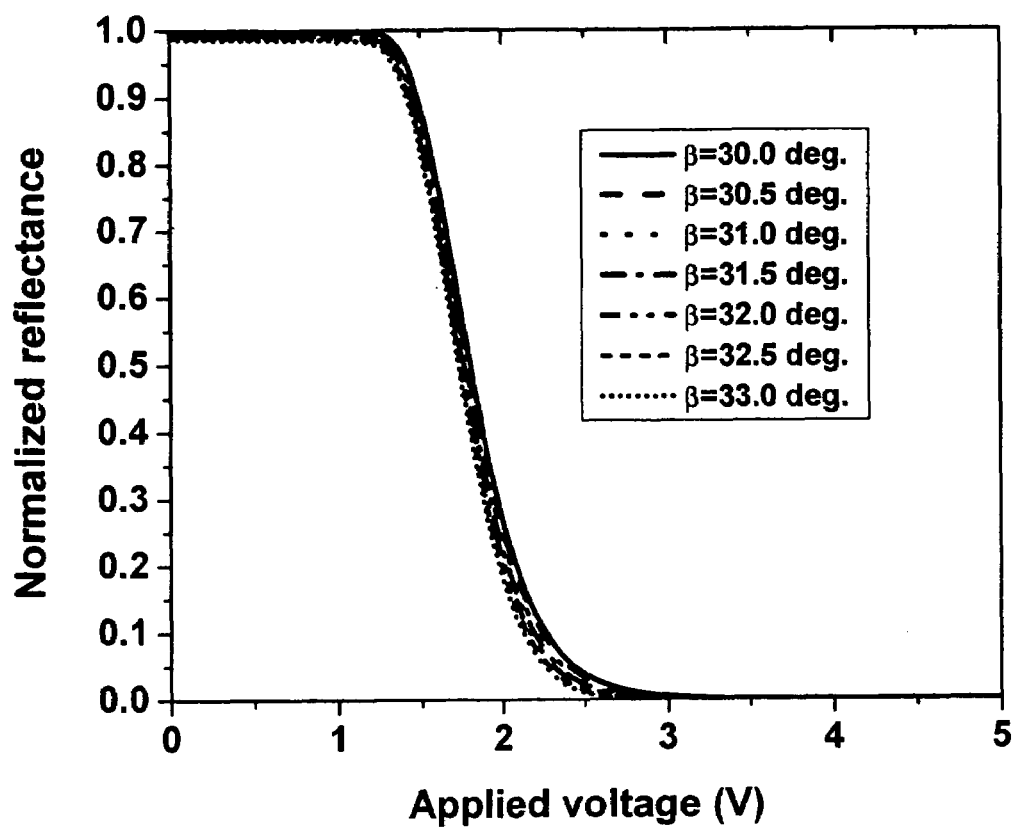
FIG. 6A is a graph of the voltage-dependent reflectance curves for the left-handed 60° cell at various polarizer angles with dΔn=350 nm and λ=550 nm. The solid line represents prior art.
Figure 6B:
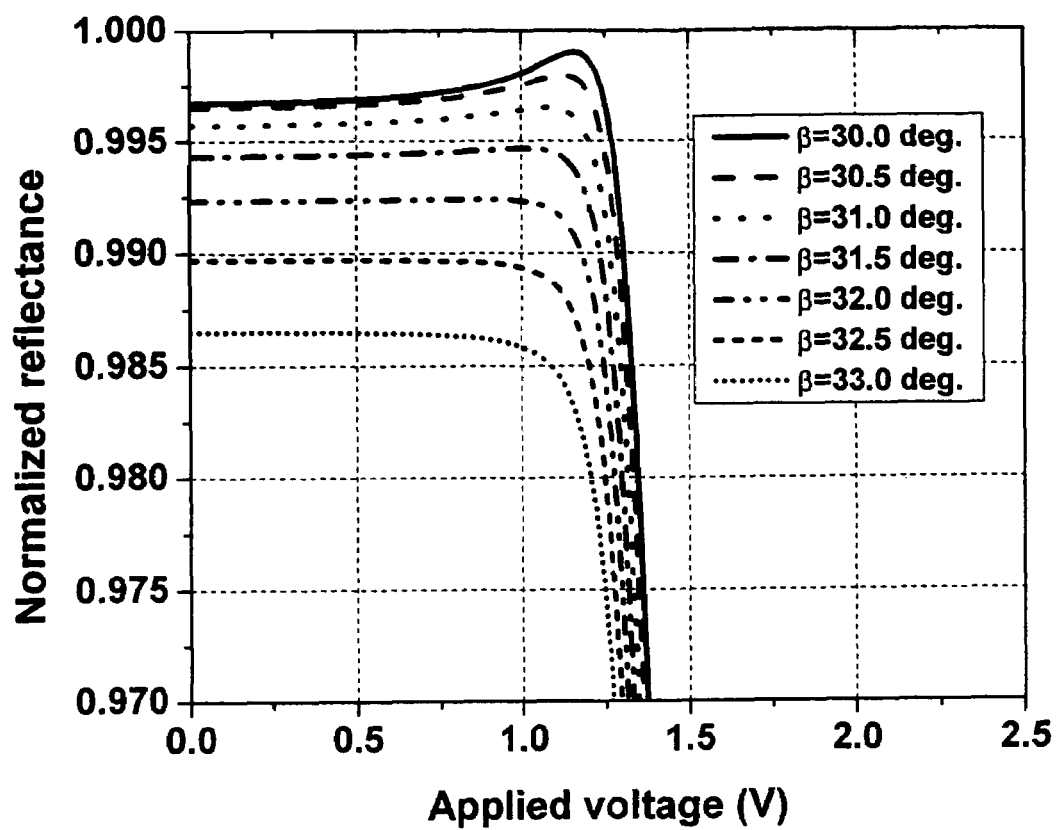
FIGS. 6B and 6C are expanded views of the graph of FIG. 6A at bright state and dark state, respectively.
Figure 6C:
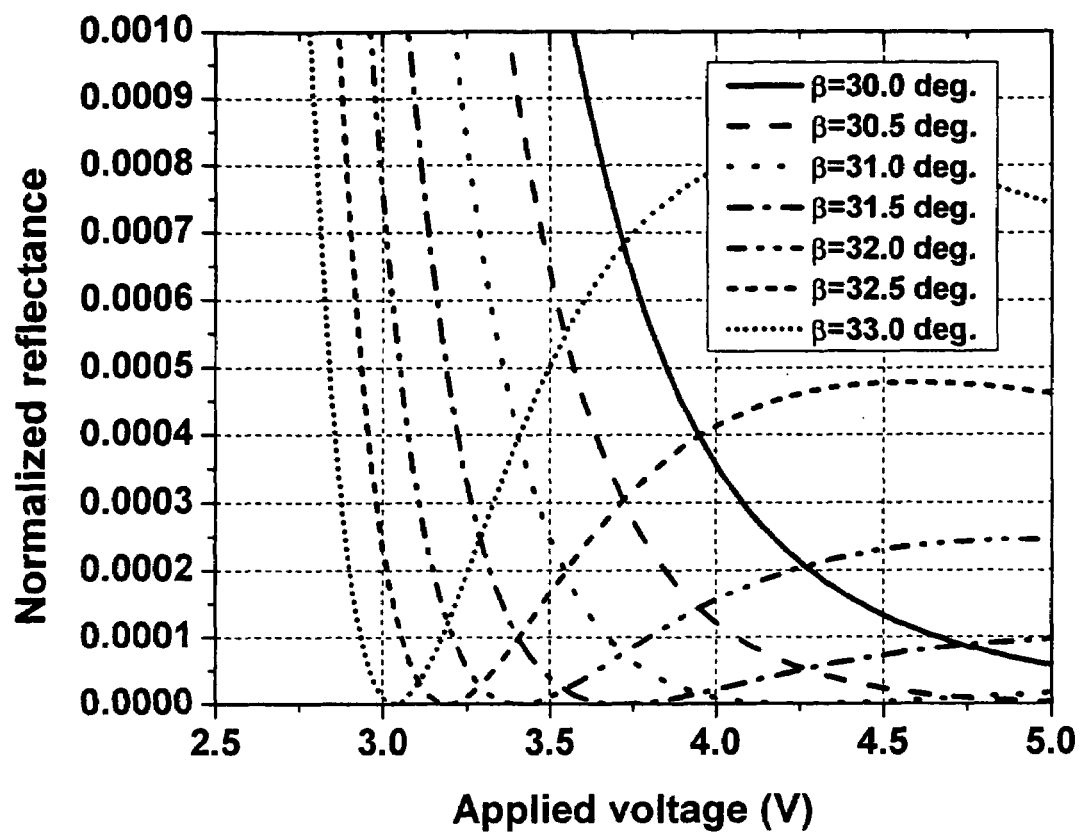

For example, FIGS. 6A, 6B and 6C illustrate the electro-optical performance showing the voltage-dependent reflectance of a left-handed approximately 60° TN cell with dΔn=0.35 μm at various polarizer angles for a green light with a wavelength λ=approximately 550 nanometers. In these graphs the solid line represents the results of the prior art with the polarizer angle set at β=30°. Assume that the PBS has a limited extinction ratio of ER=1000:1, the contrast ratio (CR) of the final system is affected by the extinction ratio of PBS as $$CR = \frac{1}{1/ER + R},$$

where R is the normalized reflectance obtained in the graphs. For example, if the normalized reflectance is R=0.00005, then the system contrast ratio would be $$CR = \frac{1}{0.001 + 0.00005} = 952:1.$$

To obtain CR=approximately 950:1, it is determined from the graph in FIG. 6C that the prior art, illustrated as the solid curve, requires a driving voltage of approximately 5 $V_{rms}$.

Applying the method of the present invention, the boundary layers are taken into consideration to determine that the optimal polarizer angle β occurs at β=31.5° instead of 30° as used in the prior art. With the polarizer angle set at approximately 31.5 degrees, the driving voltage required to obtain the dark state voltage decreases to approximately 3.5 $V_{rms}$. In other words, to achieve an improved contrast ratio CR=approximately 952:1, a driving voltage of approximately 3.5 $V_{rms}$ is required as compared to 5 $V_{rms}$ driving voltage required by the prior arts. On the other hand, if the driving voltage used by the prior art is decreased to approximately 3.5 $V_{rms}$, then the prior art configurations produce a contrast ratio of approximately $$CR = \frac{1}{0.001 + 0.0012} = 455:1.$$

In contrast, using the present invention a much higher contrast ratio $$CR = \frac{1}{0.001 + 0.00005} = 952:1$$

is achieved.

Figure 7A:
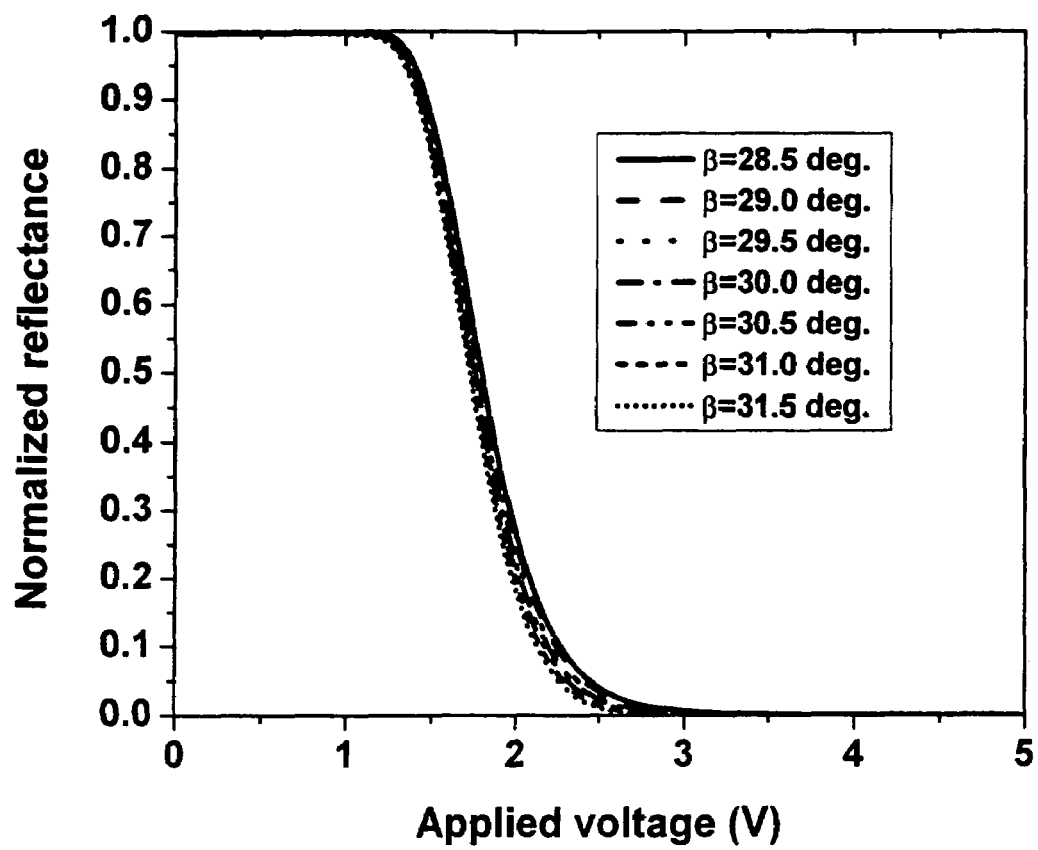
FIG. 7A is a graph of the voltage-dependent reflectance curves for the left-handed 57° cell at various polarizer angles with dΔn=350 nm and λ=550 nm. The solid line represents prior art.
Figure 7B:
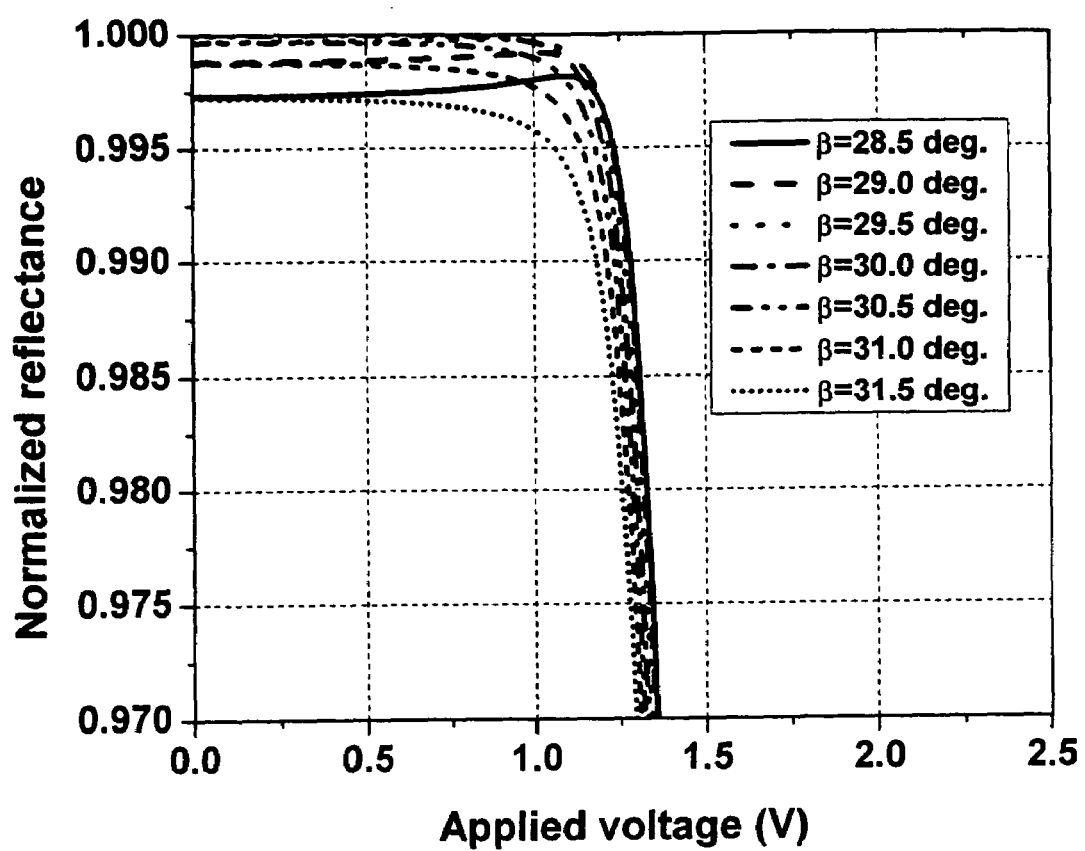
FIGS. 7B and 7C are expanded views of the graph of FIG. 7A at bright state and dark state, respectively.
Figure 7C:
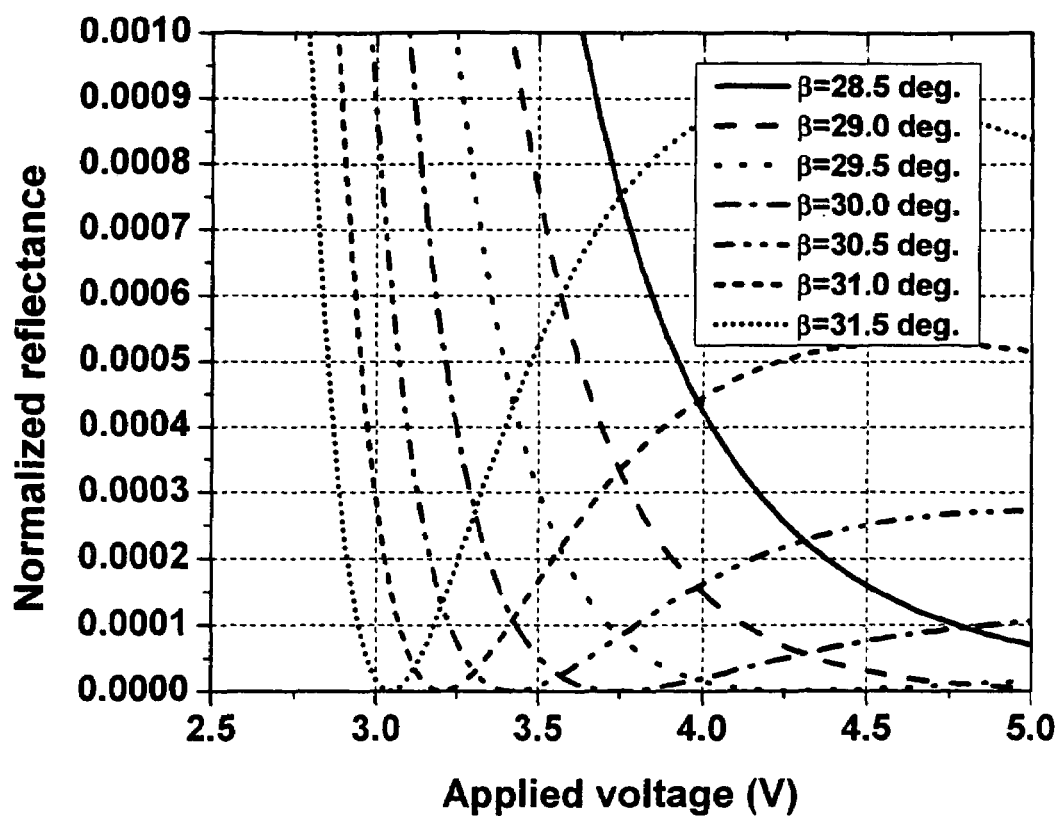

In a second example, FIGS. 7A, 7B and 7C are graphs the normalized reflectance with respect to the applied voltage for a left-handed approximately 57° TN cell with dΔn=0.35 μm at various polarizer angles for a green light (λ=approximately 550 nm). FIG. 7A is a graph of the overall electro-optical curve while FIGS. 7B and 7C are graphs of the electro-optical performance at bright state and at dark state, respectively. According to the graphs, the solid line shows the results of the prior art with the polarizer angle set at β=28.5°. Still assuming that the PBS has a limited extinction ratio of ER=1000:1 and the normalized reflectance is R=approximately 0.0001, then the system contrast ratio at approximately 4.8 $V_{rms}$ is calculated to be $$CR = \frac{1}{0.001 + 0.0001} = 909:1.$$

To obtain the same contrast ratio using the present invention, β is set to $$\beta = \frac{\phi}{2} + 1.5°$$

and the required voltage is decreased to approximately 3.4 $V_{rms}$.

Figure 8A:
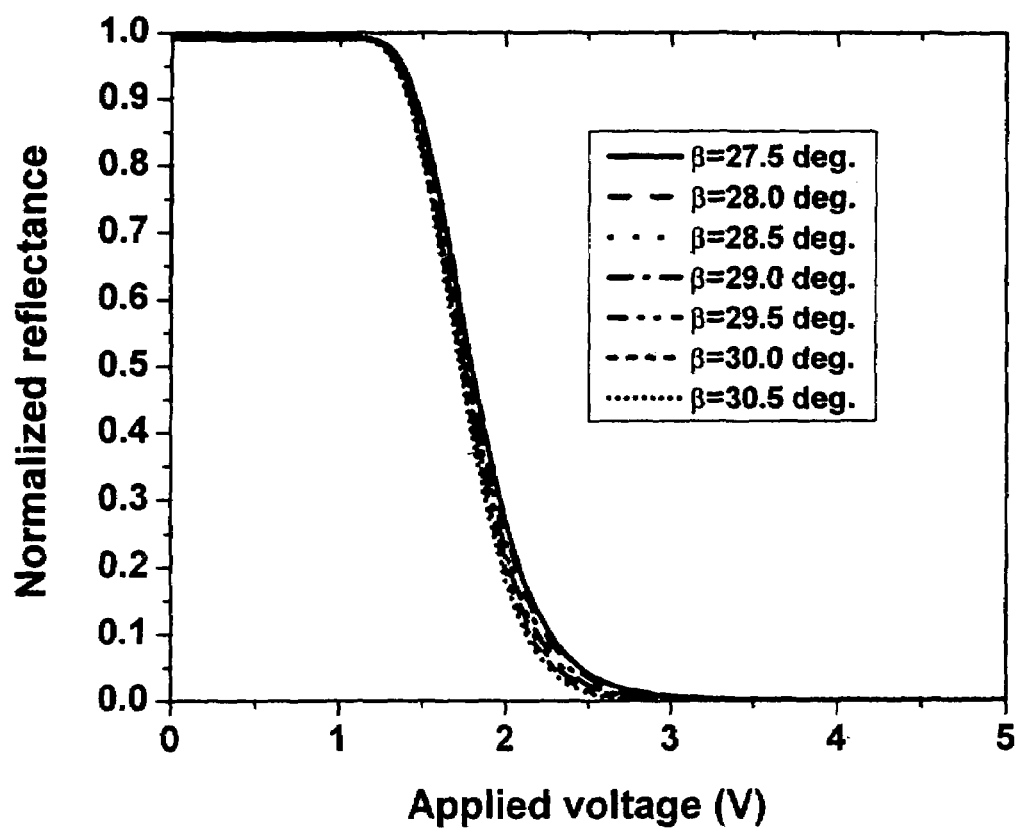
FIG. 8A is a graph of the voltage-dependent reflectance curves for a left-handedness 55° cell at various polarizer angles with dΔn=350 nm and λ=550 nm. The solid line represents prior art.
Figure 8B:
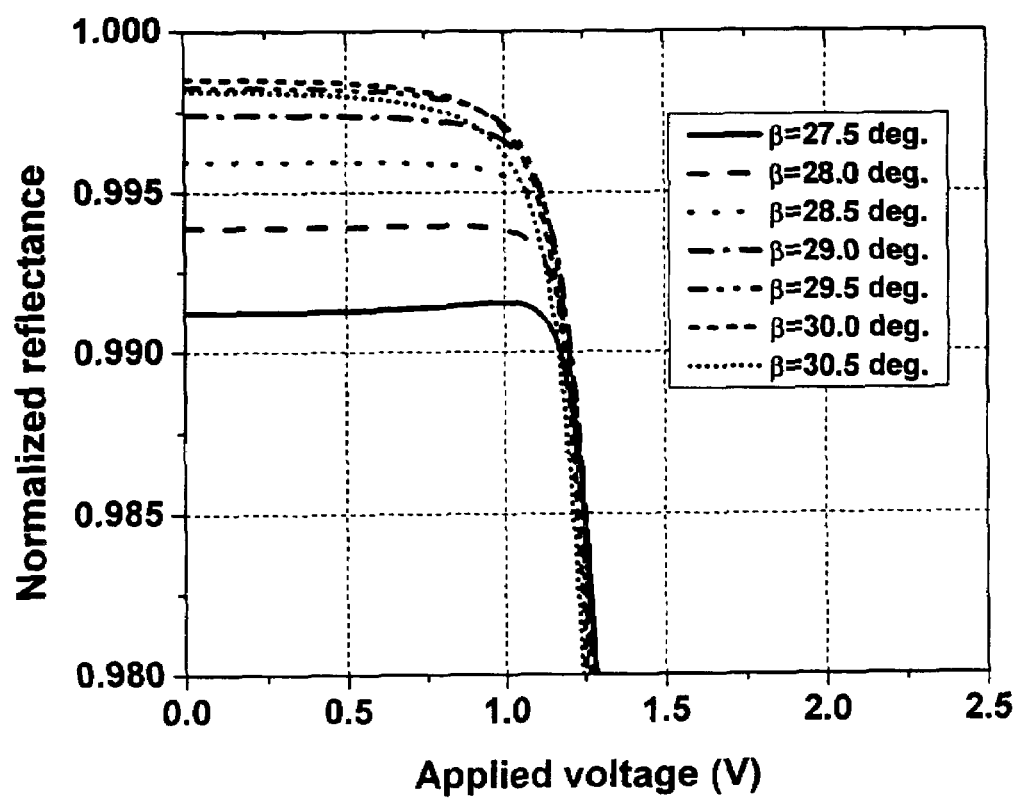
FIGS. 8B and 8C are expanded views of the graph of FIG. 8A at bright state and dark state, respectively.
Figure 8C:
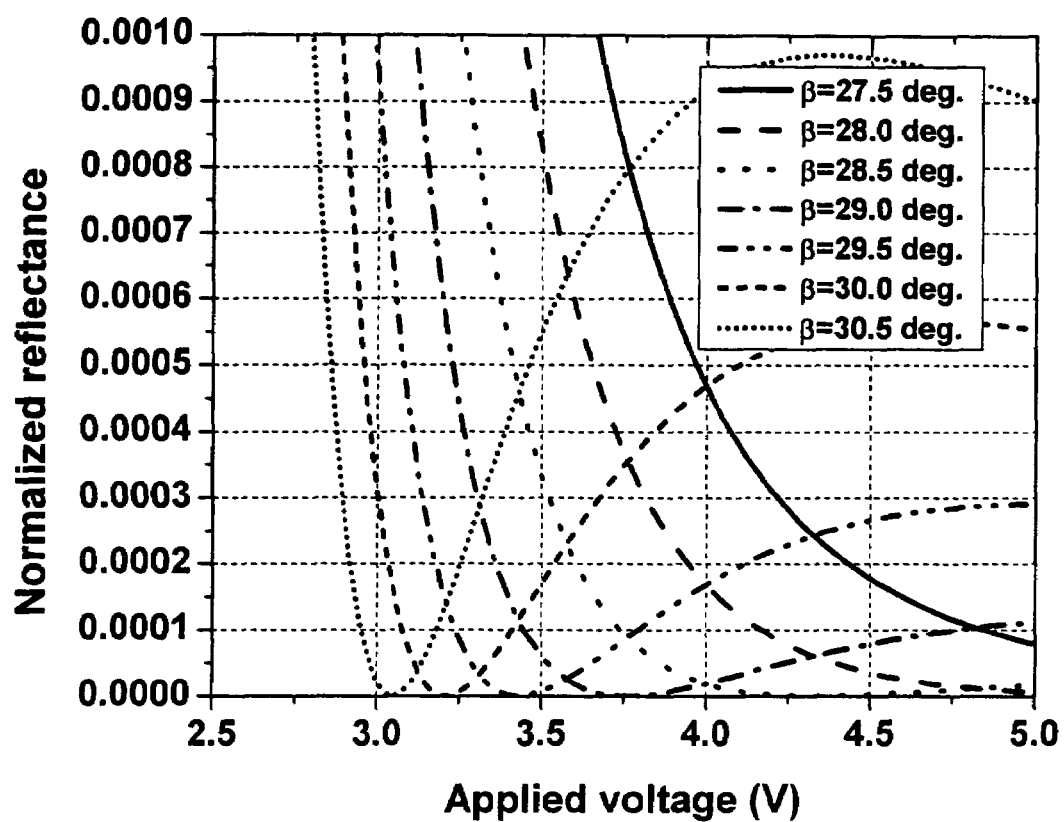

In another example, FIGS. 8A, 8B and 8C are graphs of the voltage-dependent reflectance of a left-handed approximately 55° TN cell with dΔn=0.35 μm at various polarizer angles for green light (λ=approximately 550 nm) wherein the solid line represents the results of the prior art with polarizer angle β=approximately 27.5°. Still assuming that the PBS has a limited extinction ratio of ER=1000:1 and the normalized reflectance is R=0.0001, according to the dark state graph of FIG. 8C, 4.8 V is required to obtain a contrast ratio $$CR = \frac{1}{0.001 + 0.0001} = 909:1.$$

With the configuration of the present invention, to obtain the same contrast ratio β is set to $$\beta = \frac{\phi}{2} + 1.5°$$

(approximately 29°) instead of $$\beta = \frac{\phi}{2}$$

(approximately 27.5°). According to the dark state graph of FIG. 8C, the required dark state voltage is reduced to approximately 3.4 $V_{rms}$ for the same normalized reflectance of approximately 0.0001.

Figure 9A:
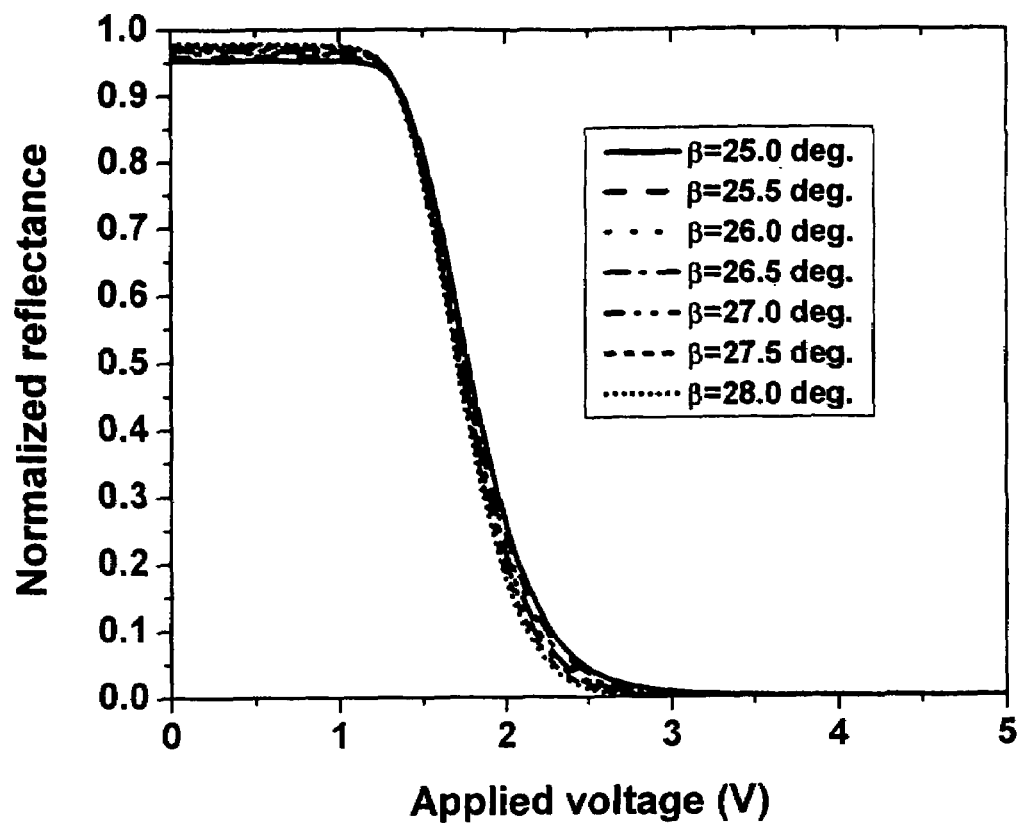
FIG. 9A is a graph of the voltage-dependent reflectance curves for left-handed 50° cell at various polarizer angles with dΔn=350 nm and λ=550 nm. The solid line represents prior art.
Figure 9B:
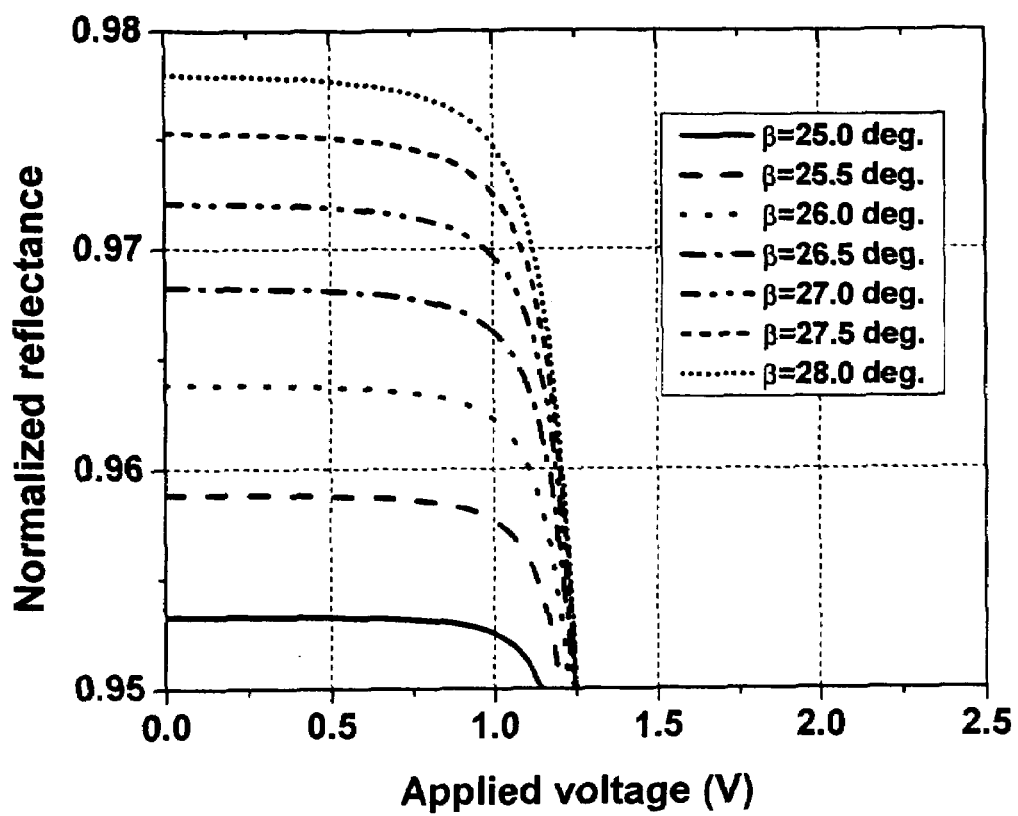
FIGS. 9B and 9C are expanded views of the graph of FIG. 9A at bright state and dark state, respectively.
Figure 9C:
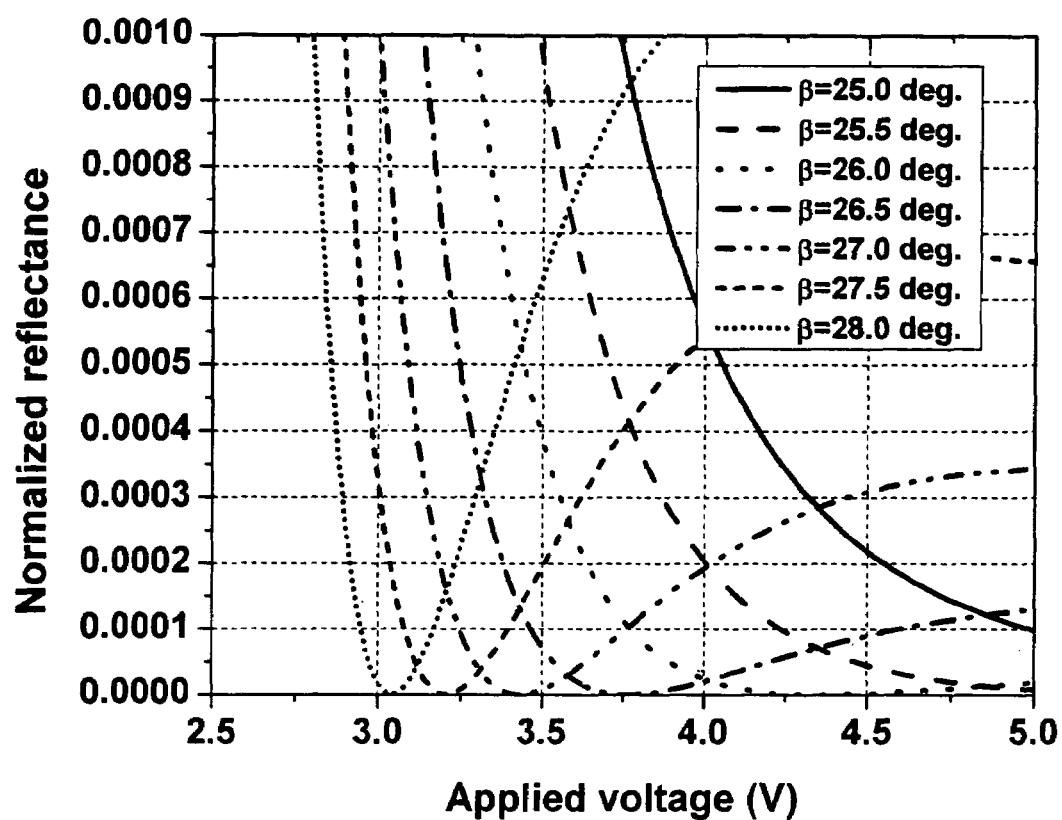

In another example, FIGS. 9A, 9B and 9C are graphs of the voltage-dependent reflectance of a left-handed approximately 50° TN cell with dΔn=0.35 μm at different polarizer angles for green light (λ=approximately 550 nm) wherein the solid line represents the results of the prior art with polarizer angle β=approximately 25°. Still assuming that the PBS has a limited extinction ratio of ER=1000:1 and the normalized reflectance is R=0.0001, according to the graphs, the prior arts require approximately 5.0 $V_{rms}$ to get a contrast ratio of $$CR = \frac{1}{0.001 + 0.0001} = 909:1.$$

Using the present invention to obtain the same contrast ratio, β is set to β=26.5° instead of approximately 25°. Referring to the dark state graph of FIG. 9C, required dark state voltage is reduced to approximately 3.4 $V_{rms}$.

Figure 10A:
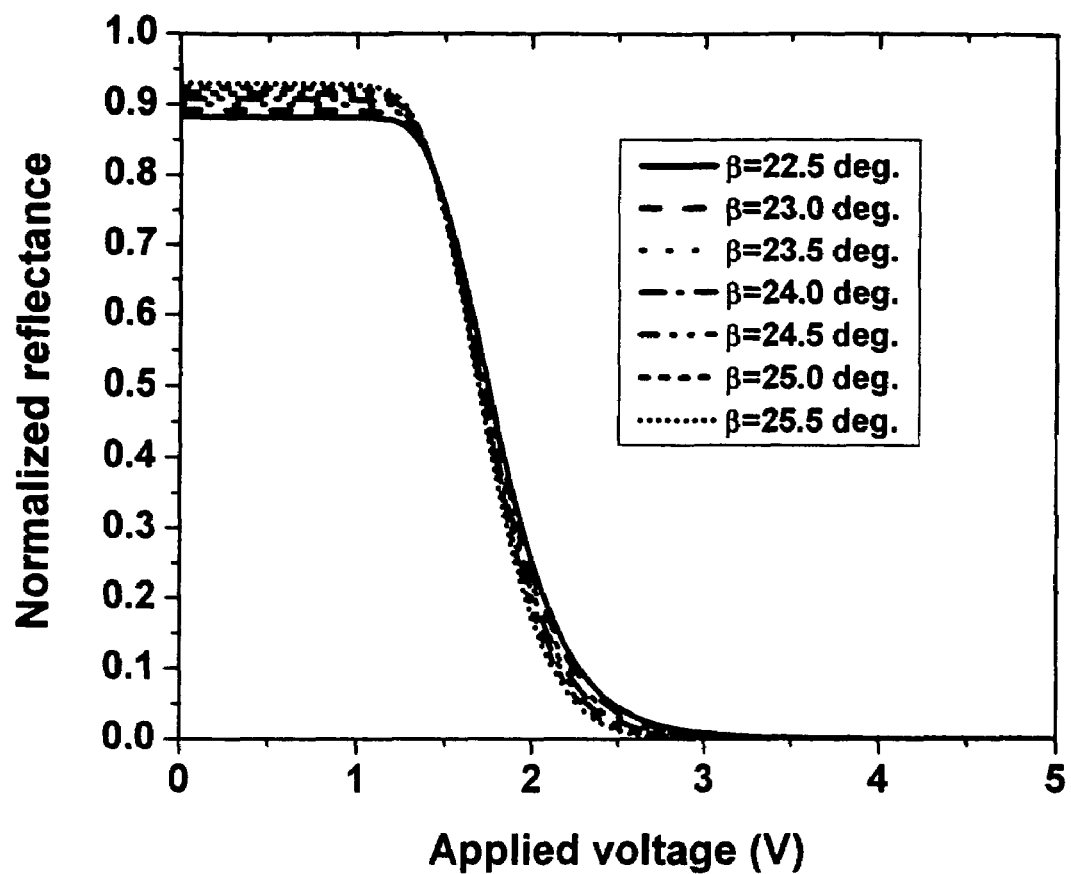
FIG. 10A is a graph of the voltage-dependent reflectance curves for a left-handedness 45° cell at various polarizer angles with dΔn=355 nm and λ=550 nm. The solid line represents prior art.
Figure 10B:
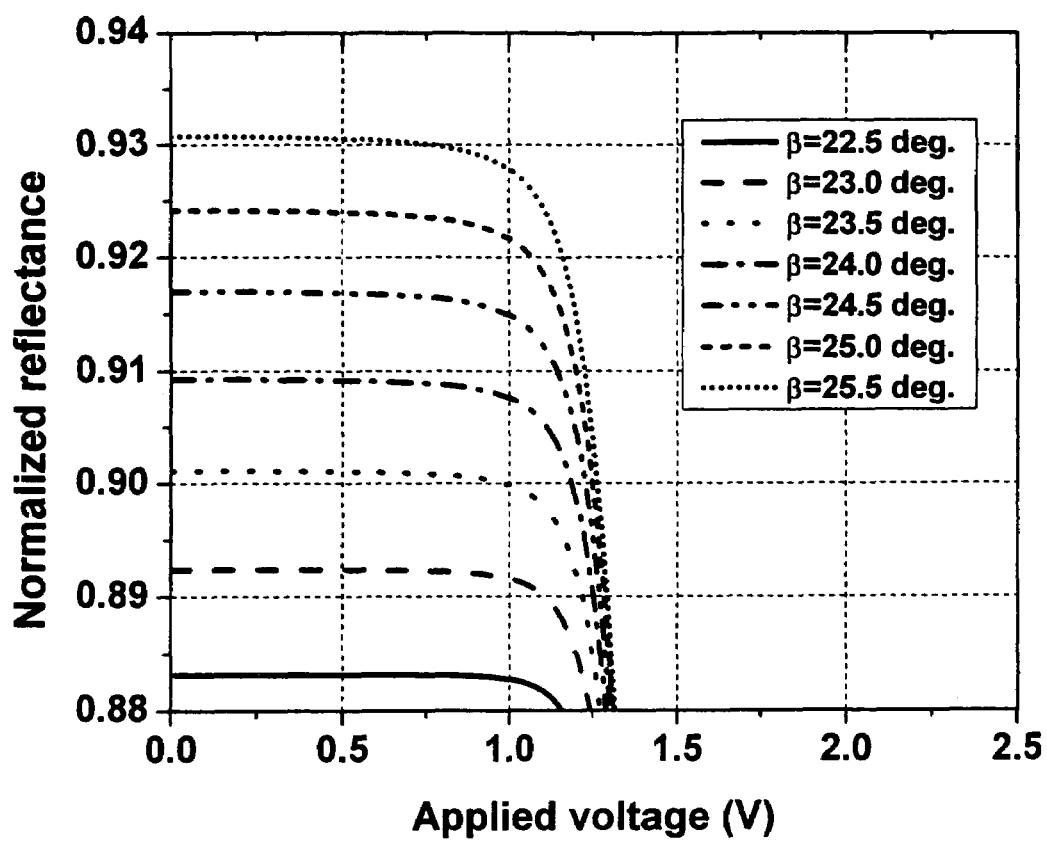
FIGS. 10B and 10C are expanded views of the graph of FIG. 10A at bright state and dark state, respectively.
Figure 10C:
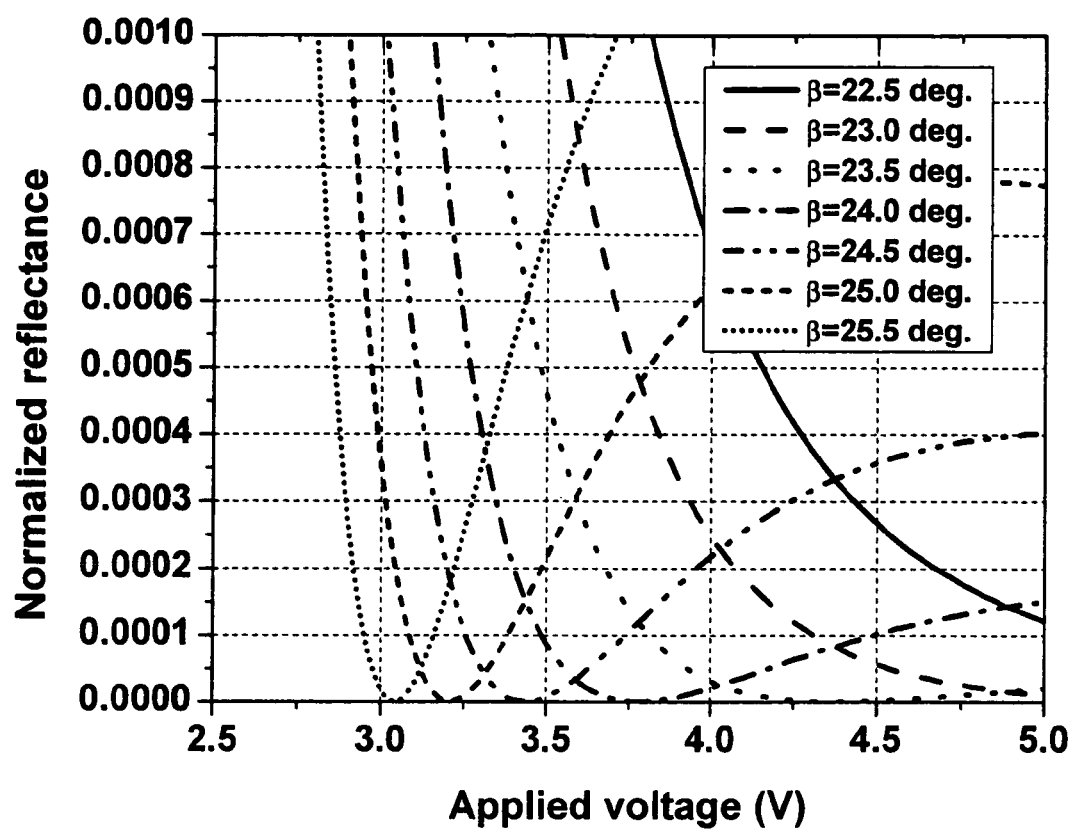

Like the previous examples, FIGS. 10A, 10B and 10C are graphs of the electro-optical performance showing the voltage-dependent reflectance of a left-handed approximately 45° TN cell with dΔn=0.355 μm at various polarizer angles for a green light (λ=approximately 550 nm) where the solid line represents the results of the prior art with polarizer angle β=approximately 22.5°. Still assuming that the PBS has a limited extinction ratio of ER=1000:1 and the normalized reflectance is R=approximately 0.0002, from the dark state graph of FIG. 10C, an applied voltage of approximately 4.7 $V_{rms}$ is required to achieve a contrast ratio of $$CR = \frac{1}{0.001 + 0.0002} = 833:1$$

in the prior art. Using the present invention, to obtain the same contrast ratio the polarizer angle β is set to $$\beta = \frac{\phi}{2} + 1.5°$$

and according to the graph of FIG. 10C, the required dark state voltage decreases to approximately 3.4 $V_{rms}$ to achieve the same contrast ratio of 833:1.

Figure 11A:
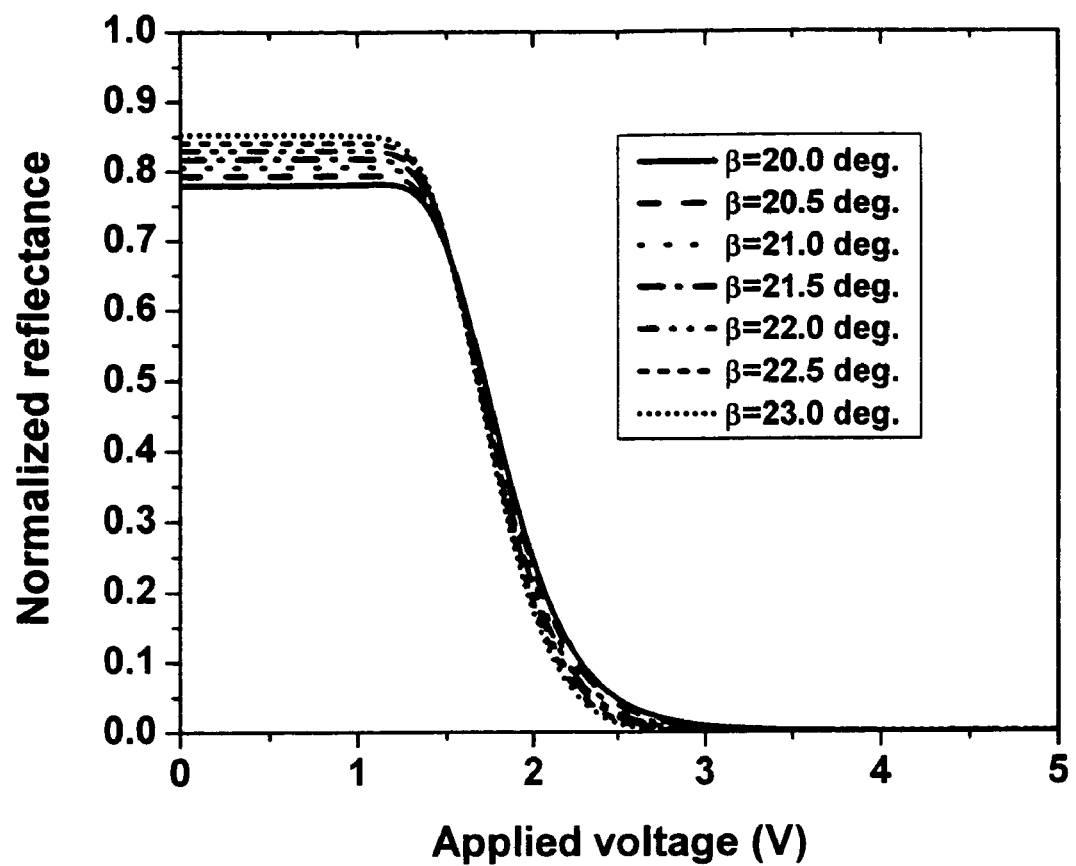
FIG. 11A is a graph of the voltage-dependent reflectance curves for a left-handedness 40° cell at various polarizer angles with dΔn=365 nm and λ=550 nm. The solid line represents prior art.
Figure 11B:
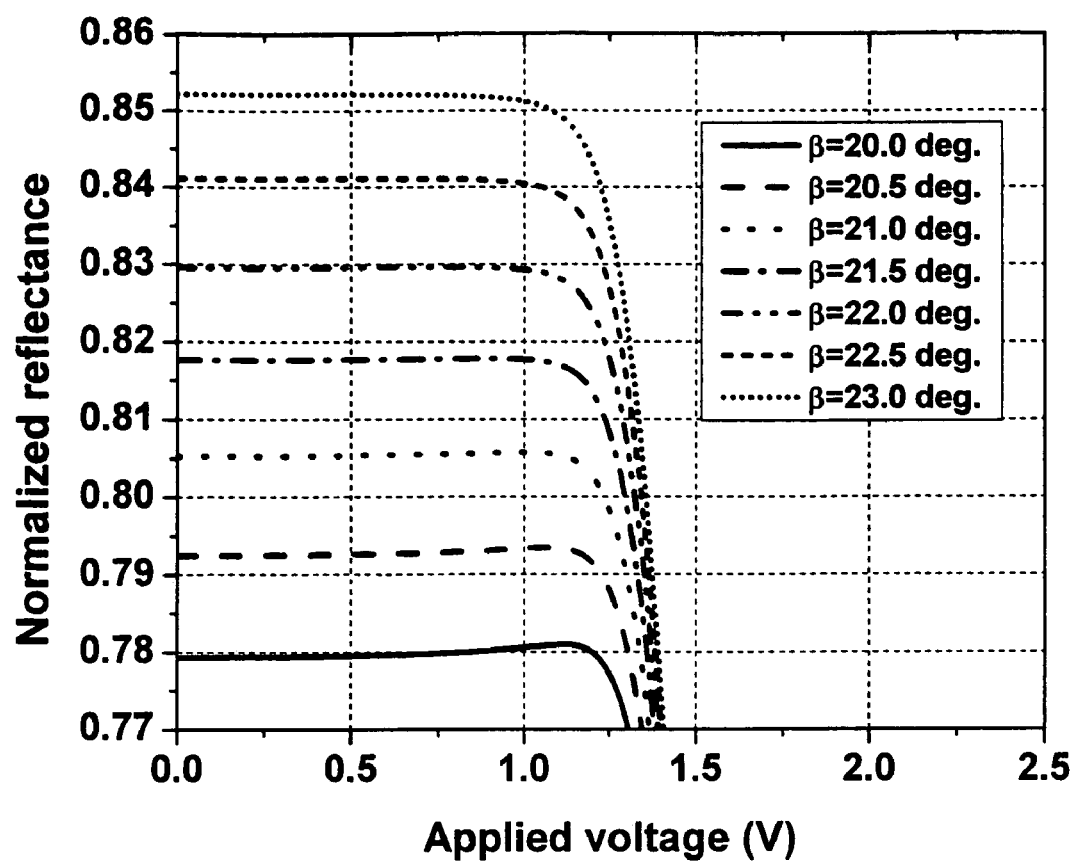
FIGS. 11B and 11C are expanded views of the graph of FIG. 11A at bright state and dark state, respectively.
Figure 11C:
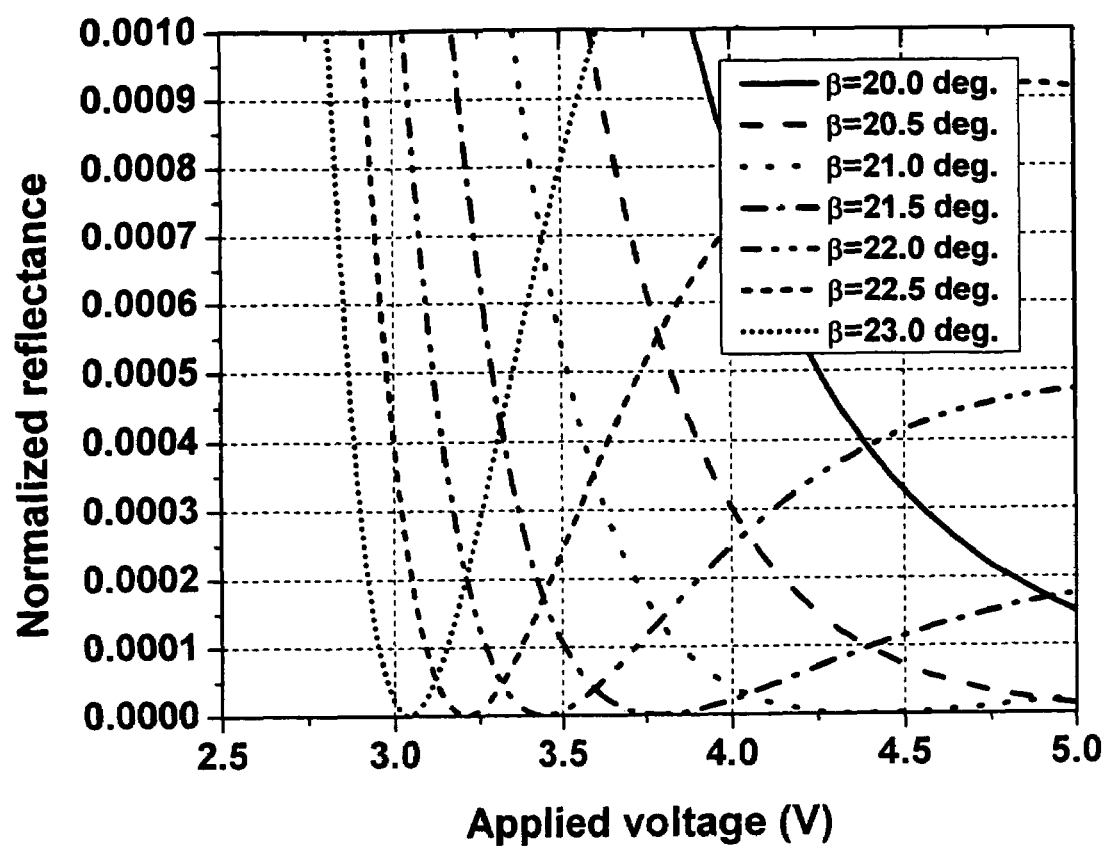
Figure 12A:
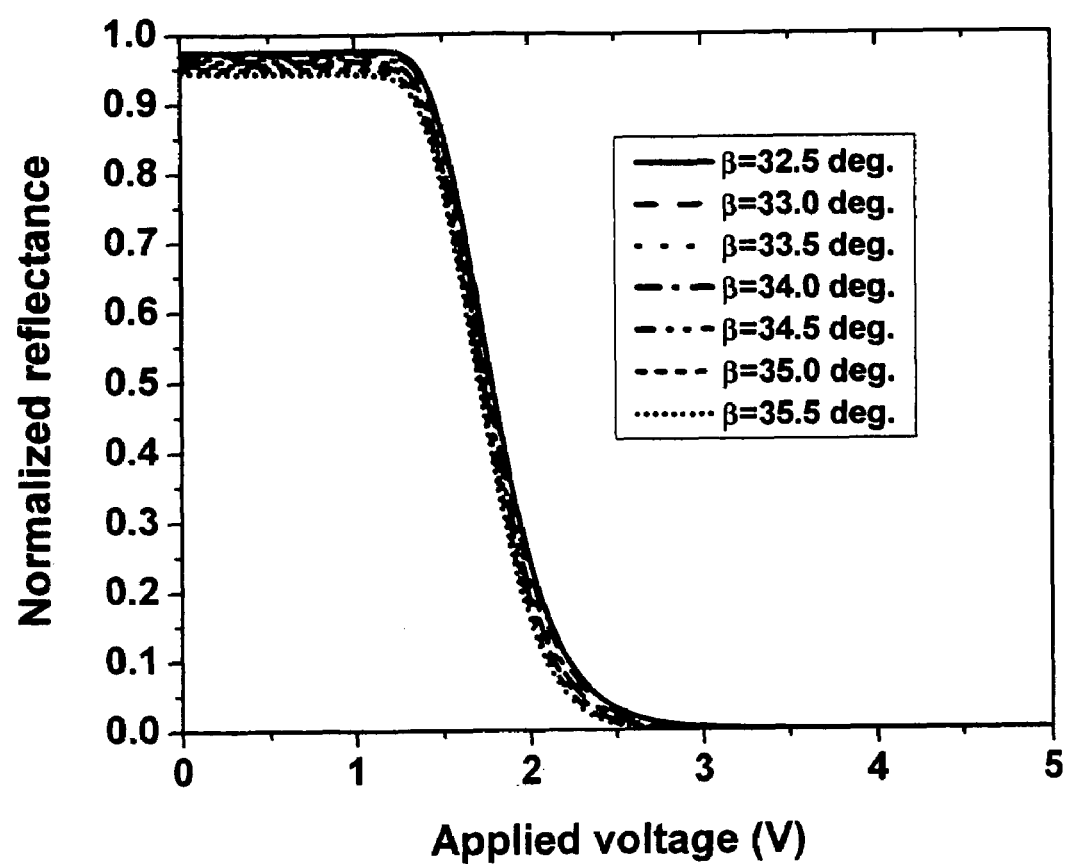
FIG. 12A is a graph of the voltage-dependent reflectance curves for a left-handed 65° cell at various polarizer angles with dΔn=345 nm and λ=550 nm. The solid line represents prior art.
Figure 12B:
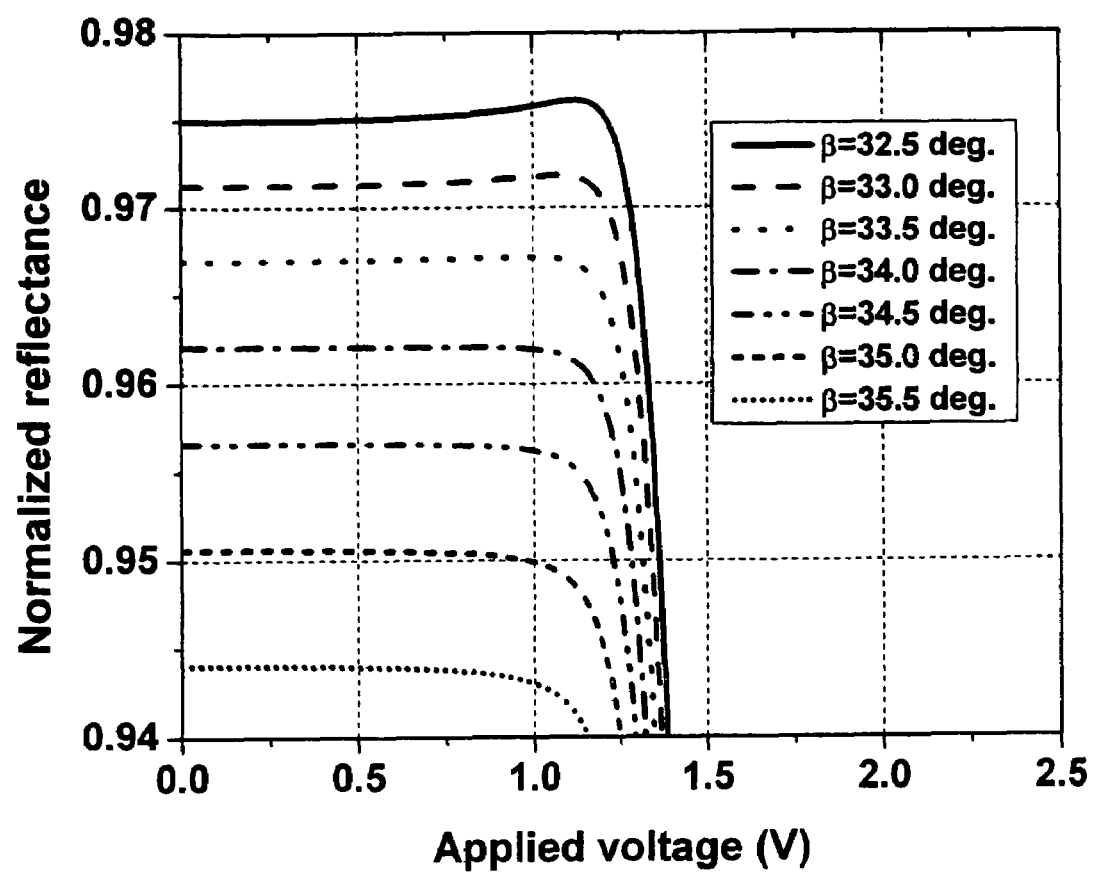
FIGS. 12B and 12C are expanded views of the graph of FIG. 12A at bright state and dark state, respectively.
Figure 12C:
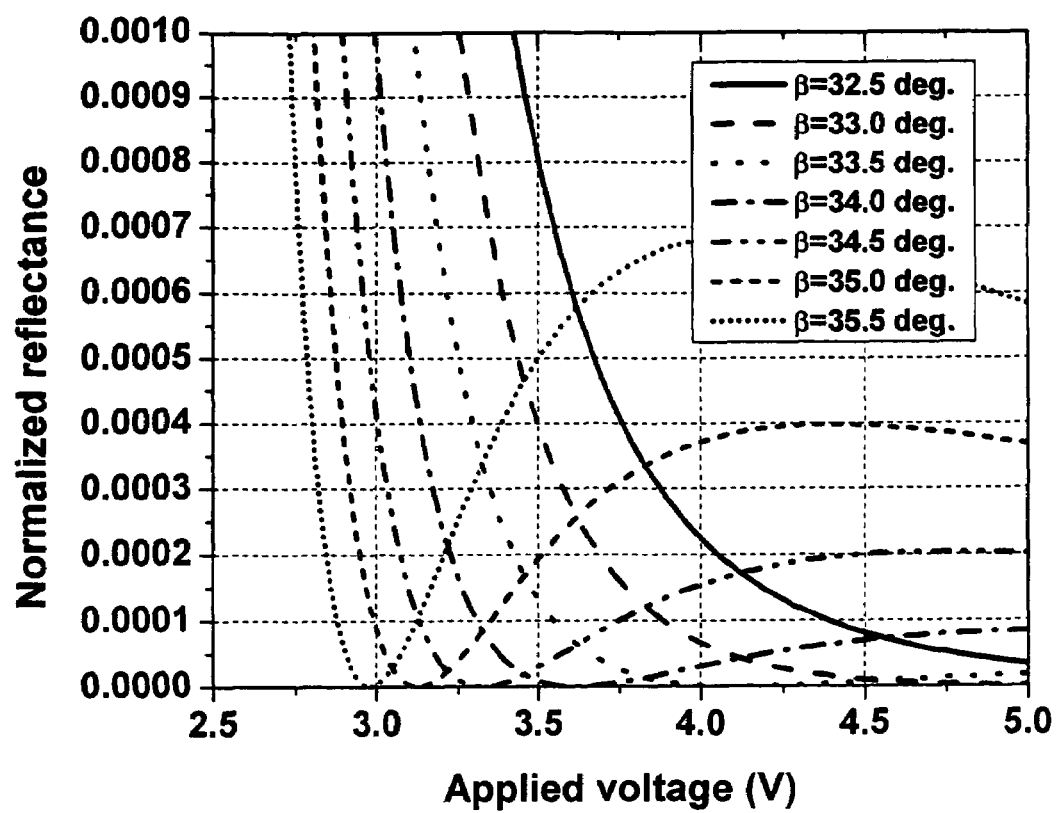
Figure 13A:
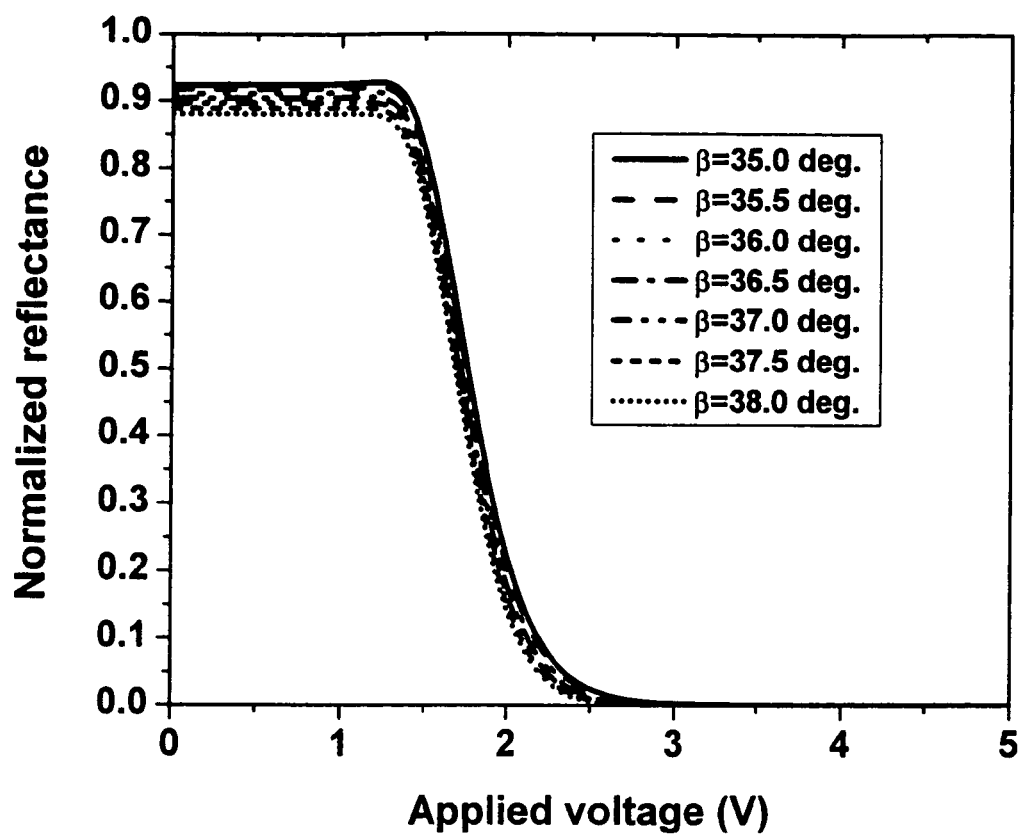
FIG. 13A is a graph of the voltage-dependent reflectance curves for the left-handed 70° cell at various polarizer angles with dΔn=345 nm and λ=550 nm. The solid line represents prior art.
Figure 13B:
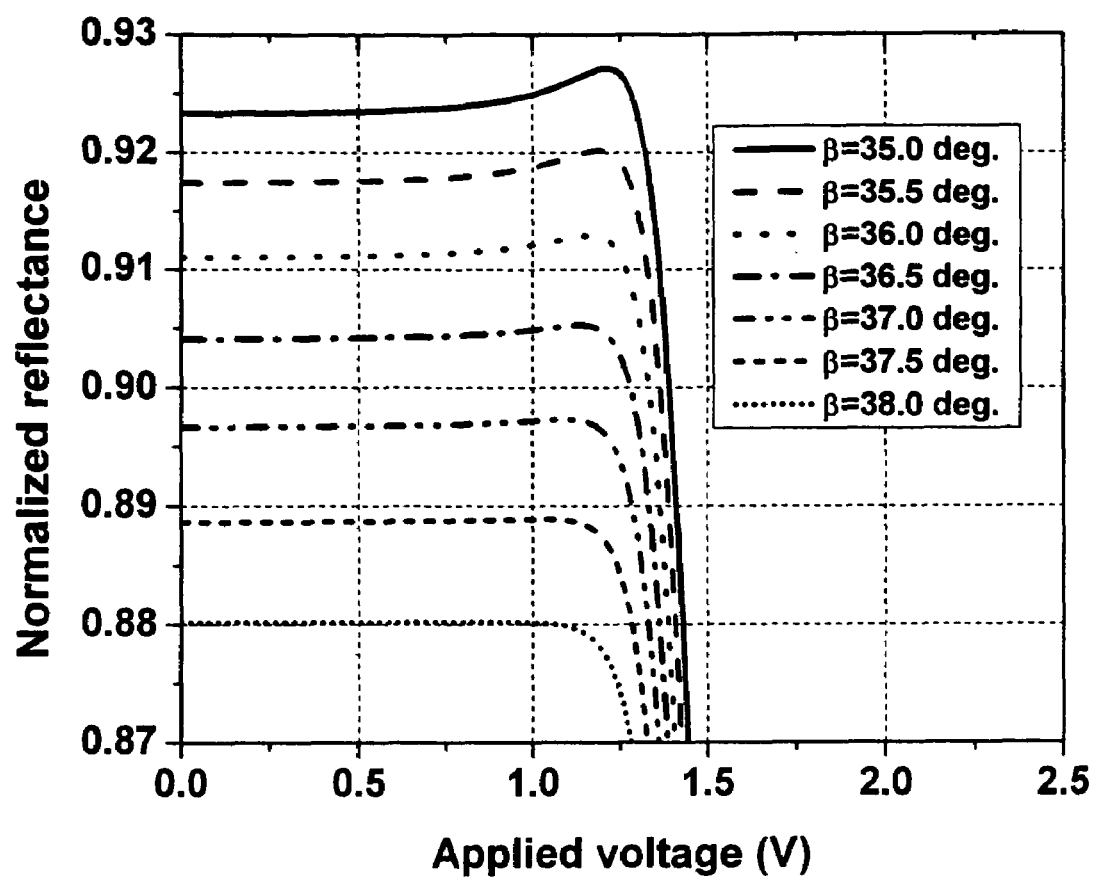
FIGS. 13B and 13C are expanded views of the graph of FIG. 13A at bright state and dark state, respectively.
Figure 13C:
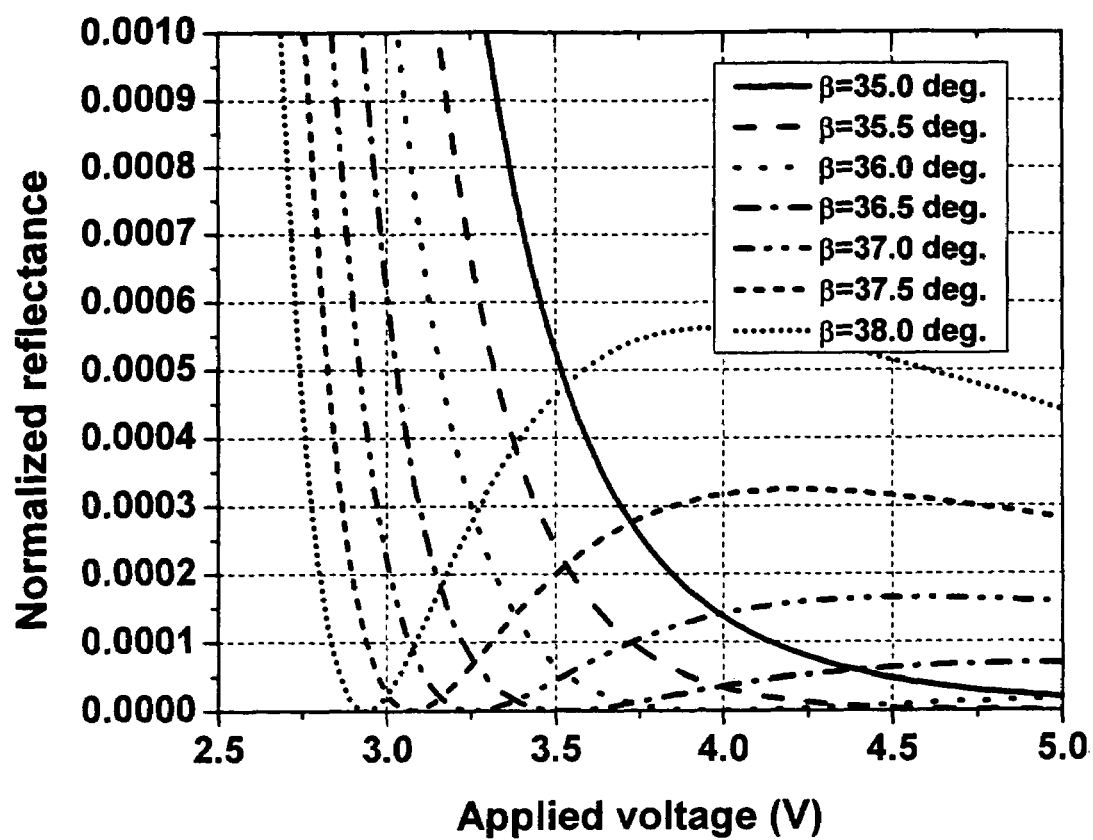

Additional examples are shown in FIGS. 11A, 11B and 11C for left-handedness 40° case, FIGS. 12A-12C for left-handedness approximately 65° case and FIGS. 13A-13C for left-handedness approximately 70° case. Like the previous examples, the solid line in these figures represents the electro-optical performance curve according to the prior art. From the examples, it is obvious that by shifting the polarizer angle β angle away from the bisector used for the prior art, a lower applied voltage is required to obtain the same contrast ratio. Alternatively, if the same driving voltage is selected, using the present invention a much higher contrast ratio is obtained.

The above described examples illustrate that for a left-hand twist liquid crystal layer with twist angle φ>0, polarizer angle β is in the range of φ/2<β<(φ/2+15°) or (φ/2±90°)<β<(φ/2+15°±90°). Following the approaches for the left-handed twist liquid crystal layer described above, for a right-handed twist liquid crystal layer with twist angle φ<0, the polarizer angle β is in the range of (φ/2−15°)<β<φ/2 or (φ/2−15°±90°)<β<(φ/2±90°).

In summary, compared to the prior art, the present invention of reflective liquid crystal valve for projection display positions the entrance polarization direction of PBS at an angle that deviates from the bisector of the twist angle to achieve the same contrast ratio at a lower driving voltage. On the other hand, when the same low driving voltage is applied to the prior art configuration and the configuration of the present invention, the contrast ratio obtained in the configuration of the present invention is much higher than that achieved by the prior art. Such a low driving voltage in the present invention eventually leads to low fringing field effect in the reflective TN-LC cell for projection display. As a result, a high image quality projection display with low driving voltage and high contrast ratio is ensured.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A reflective liquid crystal projection display device comprising:
   a transparent first substrate with a first alignment film and a first alignment direction;
   a second substrate with a second alignment film and a second alignment direction;
   a liquid crystal layer with positive dielectric constant sandwiched between the first substrate and the second substrate, the liquid crystal layer having a phase retardation value $d\Delta n/\lambda$ in the range of approximately 0.4 to approximately 0.8, where d is the thickness of the liquid crystal layer; $\Delta n$ is the birefringence of liquid crystal materials and $\lambda$ is the wavelength of incident light; and
   a linear polarizer placed outside of the first substrate which is opposite to the liquid crystal layer to linearly polarize an unpolarized light passing through the linear polarizer, the linear polarizer having a first linear polarization direction;
   a reflector on an inner side of the second substrate adjacent to the liquid crystal layer to reflect the linearly polarized light,
   an analyzer having a second linear polarization direction coupled with the linear polarizer on the outside surface of the first substrate for blocking the reflected linearly polarized light to obtain a dark state, the first linear polarization direction of the linear polarizer is approximately perpendicular to the second linear polarization direction of the analyzer, wherein the liquid crystal layer forms a twist angle $\phi$ in the range of approximately 40° to approximately 80° between the second alignment direction on the second substrate and the first alignment direction on the first substrate and the first linear polarization direction of the linear polarizer deviates from the bisector direction of the twist angle of the liquid crystal layer, the liquid crystal layer forming a left-handed twist angle $\phi$ and the polarization direction of the linear polarizer forms an angle $\beta$ with the first alignment polarization of the first substrate, wherein the angle $\beta$ is larger than $\phi/2$ and less than $\phi/2+15$ degrees.

2. A reflective liquid crystal projection display device comprising:
   a transparent first substrate with a first alignment film and a first alignment direction;
   a second substrate with a second alignment film and a second alignment direction;
   a liquid crystal layer with positive dielectric constant sandwiched between the first substrate and the second substrate, the liquid crystal layer having a phase retardation value $d\Delta n/\lambda$ in the range of approximately 0.4 to approximately 0.8, where d is the thickness of the liquid crystal layer; $\Delta n$ is the birefringence of liquid crystal materials and $\lambda$ is the wavelength of incident light; and
   a linear polarizer placed outside of the first substrate which is opposite to the liquid crystal layer to linearly polarize and not circularly polarize an unpolarized light passing through the linear polarizer, the linear polarizer having a first linear polarization direction;
   a reflector on an inner side of the second substrate adjacent to the liquid crystal layer to reflect the linearly polarized light,
   an analyzer having a second linear polarization direction coupled with the linear polarizer on the outside surface of the first substrate for blocking the reflected linearly polarized light to obtain a dark state, the first linear polarization direction of the linear polarizer is approximately perpendicular to the second linear polarization direction of the analyzer, wherein the liquid crystal layer forms a twist angle $\phi$ in the range of approximately 40° to approximately 80° between the second alignment direction on the second substrate and the first alignment direction on the first substrate and the first linear polarization direction of the linear polarizer deviates from the bisector direction of the twist angle of the liquid crystal layer, the liquid crystal layer forming a left-handed twist angle $\phi$ and the polarization direction of the linear polarizer forms an angle $\beta$ with the first alignment direction on the first substrate, wherein the angle $\beta$ is larger than $\phi/2+90$ degrees and less than $\phi/2+105$ degrees.

* * * * *